(12) United States Patent
Tanaka et al.

(10) Patent No.: US 6,330,398 B1
(45) Date of Patent: *Dec. 11, 2001

(54) VIBRATION REDUCTION APPARATUS

(75) Inventors: Etsuo Tanaka, Tokyo; Yoshio Imura, Kawasaki; Hideo Kanno, Chiba; Hiroshi Okano, Tokyo; Akira Katayama, Koganei, all of (JP)

(73) Assignee: Nikon Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/960,578

(22) Filed: Oct. 29, 1997

Related U.S. Application Data

(63) Continuation of application No. 08/352,880, filed on Dec. 9, 1994, now abandoned.

(30) Foreign Application Priority Data

Dec. 9, 1993 (JP) .................................................... 5-340380
Dec. 21, 1993 (JP) .................................................... 5-345303
Dec. 21, 1993 (JP) .................................................... 5-345304

(51) Int. Cl.[7] .................................................... G03B 17/00
(52) U.S. Cl. ............................................. 396/53; 396/55
(58) Field of Search ............................................. 396/52–55

(56) References Cited

U.S. PATENT DOCUMENTS

| | | | |
|---|---|---|---|
| 4,555,169 | * 11/1985 | Suda et al. | 354/407 |
| 5,012,270 | * 4/1991 | Sekine et al. | 354/430 |
| 5,084,724 | * 1/1992 | Maeno | 354/430 |
| 5,095,198 | * 3/1992 | Nakazawa et al. | 354/407 |
| 5,231,445 | * 7/1993 | Onuki et al. | 354/410 |
| 5,266,988 | * 11/1993 | Washisu | 354/70 |
| 5,398,132 | * 3/1995 | Otani | 359/557 |
| 5,416,558 | * 5/1995 | Katayama et al. | 354/430 |
| 5,444,512 | * 8/1995 | Morizumi | 354/430 |
| 5,463,443 | * 10/1995 | Tanaka et al. | 354/430 |
| 5,619,735 | * 4/1997 | Kai | 396/55 |
| 5,715,479 | * 2/1998 | Katayama et al. | 396/55 |

* cited by examiner

*Primary Examiner*—Christopher E. Mahoney

(57) ABSTRACT

A vibration reduction apparatus includes a vibration detector for detecting movement; and an image blur reduction mechanism including a vibration reduction optical system for preventing an image from blurring, and a drive mechanism for driving the vibration reduction optical system. The drive mechanism is controlled to drive the vibration reduction optical system in response to a detection signal from the vibration detector. The vibration detector is integrally mounted as a part of a mechanism unit including the vibration reduction mechanism.

11 Claims, 14 Drawing Sheets

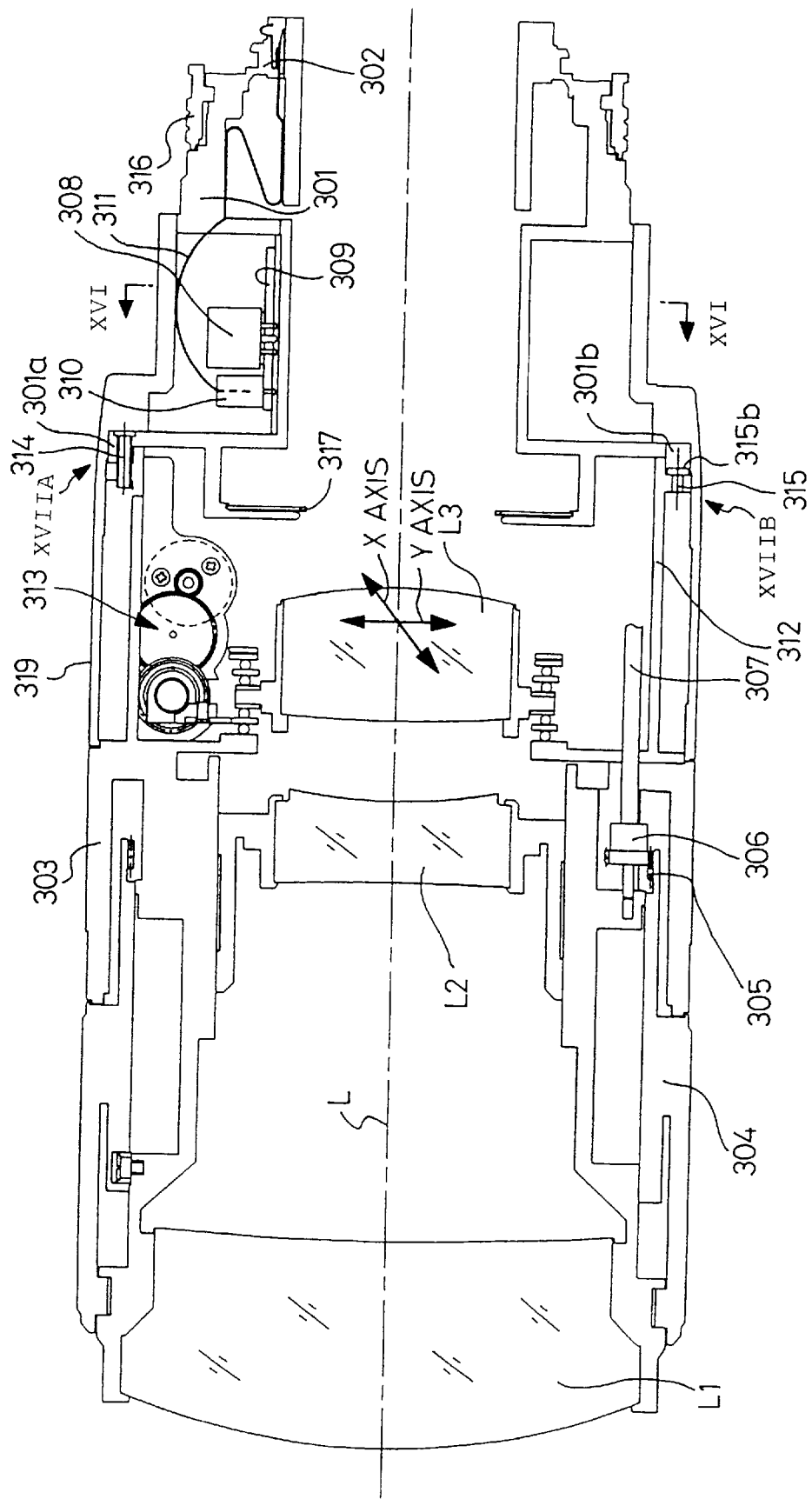

VIBRATION REDUCTION APPARATUS

This application is a continuation of application Ser. No. 08/352,880, filed Dec. 9, 1994, now abandoned.

BACKGROUND OF THE INVENTION

1. Field of the Invention

The present invention relates to a vibration reduction apparatus suitable to prevent an image from blurring due to an unintentional movement of a hand in using a camera, and more particularly to a vibration reduction apparatus having a vibration detecting means with an improved built-in structure that detects the movement of a camera. The present invention also relates to a vibration reduction apparatus that allows a vibration detecting means and a vibration reduction mechanism to be readily adjusted to a desired positional interrelationship.

2. Related Background Art

Current cameras have been sophisticatedly automated and particularly the various sections including the auto-exposure mechanism and the auto-focus mechanism have been remarkably converted into electronic form. However, this kind of camera still includes insufficiently automated sections. Countermeasures against an image blur that occurs due to movement of hands in manually taking a photograph have been tried for a long time.

In order to prevent an image blur due to movement of a camera, particularly, tilt or vibration of a camera, cameras with vibration reduction devices are well-known conventionally. The vibration reduction device detects vibration of a camera using a vibration detecting means such as an acceleration sensor and a vibration sensor, and shifts the photographing lens system (main optical system) or the partial optical system acting as a vibration reduction optical system (vibration reduction lens) in the direction perpendicular to the optical axis in accordance with the resultant detection.

In a camera with the vibration reduction function, the vibration reduction optical system (hereinafter, referred to a vibration reduction lens) forming at least a part of a photographing lens system is movably supported. In order to cancel the image blur, the shift of an image on a film surface due to vibration is corrected by shifting or moving in the vibration absorbing direction over the surface perpendicular to the optical axis of the main optical system, in accordance with the vibration of a camera detected by means of the vibration detecting means.

The vibration reduction device having the drive mechanism to shift the vibration reduction lens is disclosed in Japanese Patent Application Laid-Open No. 3-110530.

In this prior-art structure, the lens frame for the vibration reduction lens is movably held in the plane perpendicular to the optical axis, and the vibration reduction lens is directly driven and traveled by effecting the drive force acting as a push force and stretching force of the drive means (such as motor, gear chain, lever or screw shaft, ball, and V-shape groove) on the lens frame via a connecting means (such as a rod member or drive shaft).

In order to construct such a vibration reduction apparatus, it is necessary to build a vibration detecting sensor, or a camera vibration detecting means, inside a camera.

In Japanese Patent Application Laid-Open No. 5-61091, the present applicant proposed a camera where a vibration detecting sensor such as an acceleration sensor or vibration gyroscope for a vibration detection is arranged in either a space between the outer wall of the spool room and the photographing lens barrel or a camera obscura or a space between the outer wall of the film cartridge room and the photographing lens barrel or camera obscura, whereby the internal space of the camera can be effectively used.

That is, the camera body is formed of two sections: a rear body including a film cartridge room, a spool room, an aperture, a camera obscura, and the like and a front body including a photographing lens barrel and the like. This prior art structure is adopted in consideration of an easiness to assemble elements into the rear body because it is desired to arrange the vibration detecting sensor inside a camera because of the assembly convenience.

According to the structure, the internal space of a camera, and particularly the dead space in the rear body, is utilized cleverly and the vibration detecting sensor can be assembled simply and suitably in a camera without leading to a large-size of a camera.

However, according to the above-mentioned prior art, the vibration detecting sensor built-in the rear body of a camera body causes essentially the following disadvantages.

The vibration reduction lens, which constitutes a part of the photographing lens, is built in the front body. As described above, the mechanism shift-driving the lens is arranged in the front body while the vibration detecting sensor is built in the rear body.

The problem is that it is necessary to match the sensitivity axis of the vibration detecting sensor with the shift axis of the vibration reduction lens to achieve the vibration reduction effect with good accuracy.

In the prior art, the vibration reduction lens is built in the front body while the vibration detecting sensor is built in the rear body. The prior art structure makes it impossible to adjust the sensitivity axis of the vibration detecting sensor after the front body has been assembled in the rear body. Hence, there has been a disadvantage in that it is impossible actually to match the direction of the shift axis of the vibration reduction lens with that of the sensitivity axis of the vibration detecting sensor.

If such a positional shift occurs, it is necessary to disassemble again the front and rear bodies and then to reassemble them over an adjusting work so as to positionally matched them. It has been impossible to avoid the problem that the assembling work is troublesome and complicated.

Particularly, in order to obtain the vibration reduction function, it is important to align and adjust the vibration reduction lens or the drive mechanism with the vibration detecting sensor. It has been desired long to take a countermeasure that can solve the above-mentioned problems.

Furthermore, according to the prior-art structure, it has been impossible to remove the positional shift and the directional shift which are caused by the backlash or play between the lens barrel with a vibration reduction lens and the rear body of a camera with a vibration detecting sensor.

Particularly, the vibration reduction lens arranged in the lens barrel is movably held by combining together the drive control unit, a fixture barrel such as a straight guide barrel and a cam barrel, and a movable barrel. It is impossible to avoid the play or loose tolerance due to the processing accuracy and assembling accuracy of the components as well as the movable connecting means. Hence, it has been impossible actually to adjust the position between the vibration reduction lens and the vibration detecting sensor in a desired state.

Therefore, since the prior art vibration reduction apparatus has advantages and disadvantages, it has been desired for a long time to take a countermeasure that can solve the above-described problems.

However, there has been a disadvantage in that where the prior-art vibration reduction lens barrel includes angular velocity sensors as vibration sensors that detect respectively an angular velocity around the horizontal axis (X-axis) and an angular velocity around the vertical axis (Y-axis), it takes much time to adjust the position of the optical axis of each angular velocity sensor. Also, there has been a problem in that it is difficult to register with good accuracy each angular sensor with respect to the upper and lower portion of a camera body.

Moreover, there has been a problem in that it takes a great deal of time to align the sensitivity direction of the angular velocity sensor with the drive direction of the vibration reduction mechanism in which the vibration reduction optical system moves in the directions of the X-axis and Y-axis.

In order to position accurately the sensitivity direction of the angular velocity sensor, it is desired that the angular velocity sensor is arranged, as possible, adjacent to the lens mount at the reference position of the lens barrel so that the accumulated error becomes small. However, there has been a problem in that since the diaphragm and the AF drive transmission unit are in an arranged state, a sufficient space cannot be ensured.

SUMMARY OF THE INVENTION

In order to overcome the foregoing problems, an object of the present invention is to provide an improved vibration reduction apparatus which has a simplified structure and can be manufactured at a low cost. This vibration reduction apparatus can use the vibration detecting means to the full vibration reduction function by adjusting simply and certainly the mutual position between the vibration reduction optical system and the drive mechanism. According to the vibration reduction apparatus, units are prepared before assembling the entire camera system, thus simplifying the assembling work and reducing the processing and assembling accuracy.

In order to achieve the objects described above, the vibration reduction apparatus according to the present invention is characterized by an image blur reduction mechanism including a vibration reduction optical system arranged shiftably over a plane perpendicular to an optical axis of a main optical system to reduce an image blur, and a drive mechanism for driving the vibration reduction optical system; and a means for detecting vibration to drive and control the image blur reduction mechanism. The vibration detecting means is integrally mounted as a unit to a part of a mechanism unit including the lens barrel with the image blur reduction mechanism and a front camera body so as to be adjustable at the mounting position and in the mounting direction.

The vibration reduction apparatus according to the present invention has a pair of vibration detecting means which detect two directional vibrations, respectively, and is mounted on a signal substrate with the sensitivity axes of the pair of vibration detecting means mutually aligned. The substrate is mounted on the flat portion of the mechanism unit perpendicular to the optical axis while the mounting position and the direction of the vibration detecting means are adjustable.

Furthermore, in the vibration reduction apparatus according to the present invention, the flat portion perpendicular to the optical axis of the photographing lens barrel including a vibration reduction optical system is integrally mounted to a part of a lens barrel and the mechanism unit such as a front camera body. A signal substrate on which the vibration detecting means are mounted in two directions are attached as a unit to the flat portion while the mounting position and the mounting direction are adjustable. Thus the shift axis of the vibration reduction optical system is agreed with the sensitivity axis and direction of the vibration detecting means by adjusting the mounting position and direction of the substrate.

According to the present invention, the vibration detecting means mounted in two directions are assembled on a single substrate and then the mutual sensitivity axes are oriented previously. Then a unit is made by mounting the complete substrate to the lens barrel having a vibration reduction optical system and a drive mechanism. Thus the direction of the shift axis of the vibration reduction optical system is adjusted and agrees with the direction of the sensitivity axis of the vibration detecting means and the direction of the substrate.

This structure allows the mounting direction of each element of the vibration reduction mechanism to be adjusted easily. As a result, the unit building method can lead to the miniaturization and the vibration reduction function can be performed with good accuracy.

Particularly, according to the present invention, in order to construct the entire system with units, a substrate mounting a vibration detecting means is mounted on a part of a mechanism unit such as a lens barrel or front camera body on which an image blur reduction mechanism is mounted. Hence, before the unit is assembled in a camera body, the sensitivity of the vibration detecting means as well as the drive state of the vibration reduction optical system can be checked and adjusted easily and certainly.

In another aspect of the present invention, a vibration reduction lens barrel by which the optical axis of the photographing optical system of the vibration sensor can be adjusted easily and with good accuracy is provided. The vibration reduction lens barrel also can be provided in which two vibration sensors are arranged reasonably in a limited setting space.

The vibration reduction lens barrel according to the present invention includes a vibration sensor for detecting vibration, and a position adjusting means for adjusting the direction of the sensitivity of the vibration sensor the respect to the optical axis of a photographing optical system.

A vibration reduction lens barrel according to the present invention includes a vibration sensor for detecting movement; a fixture barrel integrally mounted to a lens mount; a substrate which is mounted on the fixture barrel, on which the substrate vibration sensor is fixed; and a rotation center shaft supporting rotatably the substrate with respect to the fixture barrel; the substrate having an adjusting groove formed therein; and a position adjusting member mounted rotatably on the fixture barrel and having an eccentric cam engaging with the adjusting groove. In the vibration reduction lens barrel, the fixture member may preferably be arranged to fix the substrate to the fixture barrel after an adjustment by means of the adjusting member.

According to the vibration reduction lens barrel, the substrate is supported rotatably on the rotational center shaft of the fixture barrel in the fixture barrel to rotate the position adjusting member with the eccentric cam. Hence, the simplified structure allows an easy positional adjustment. After the positional adjustment, the fixture member is fixed at the resultant position to prevent the positional shift.

According to the present invention, a vibration reduction lens barrel includes two vibration sensors each for detecting vibration; a fixture barrel integrally mounted on a lens mount; and a substrate mounted on the fixture barrel, on which substrate the vibration sensors are fixed; the fixture barrel having two flat portions (1X, 1Y) used to fix the substrate, the two flat portions formed to be perpendicular to each other. The two vibration sensors are arranged so as to be close to each other by a predetermined shift (Δ). Since two vibration sensors are arranged so as to be close to each other by a predetermined shift, they can be reasonably arranged in a limited mounting space.

In another aspect of the present invention, a vibration reduction barrel is provided in which the vibration sensor can be aligned with a camera body easily and with good accuracy. In still another aspect of the present invention, a vibration reduction lens barrel is provided in which the sensitivity direction of the vibration sensor can be aligned with the drive direction of the vibration reduction mechanism easily and with good accuracy.

According to the present invention, a vibration reduction lens barrel includes a vibration sensor for detecting vibration; a vibration reduction optical system which shifts substantially in a vertical direction to the optical axis to reduce vibration; and a vibration reduction mechanism for driving the vibration reduction optical system in response to a control signal based on the output from the vibration sensor. The vibration sensor is fixed to a fixture barrel integrally fixed to a lens mount.

As for the lens barrel, since the vibration sensor is fixed on the fixture barrel integrally mounted to a lens mount, the upper and lower positions of the vibration sensor and the camera body can be set easily and with good accuracy. In this case, the adjustment of both the sensitivity direction of the vibration sensor and the drive direction of the vibration reduction mechanism does not affect the relation between the vibration sensor and the lens mount, or the upper or lower position of the camera body.

In the vibration reduction lens barrel, the vibration reduction mechanism may be fixed to the vibration reduction unit housing connected to the fixture barrel. Moreover, the vibration reduction lens barrel may include an angular setting means which sets the mutual angular position around the optical axes of the fixture barrel and the vibration reduction unit housing. This structure can easily adjust the rotational position in the sensitivity direction of the vibration sensor and the rotational position in the drive direction of the vibration reduction mechanism.

The vibration reduction lens barrel may include a vibration reduction mechanism fixed to the vibration reduction unit housing connected to the fixture barrel and an angular adjusting means for adjusting the mutual angle position around the optical axis with respect to the vibration reduction unit housing. This structure can easily adjust the rotational position in the sensitivity direction of the vibration sensor and the rotational position in the drive direction of the vibration reduction mechanism.

The angle adjusting means includes an eccentric pin arranged in the fixture barrel or vibration reduction unit housing, and a groove formed in the vibration reduction housing or fixture barrel to engage with the eccentric pin. The mutual angular position around the optical axis of the fixture barrel and the vibration reduction unit housing is adjusted by rotating the eccentric pin. This feature allows a delicate adjustment of the rotational position.

In the vibration reduction lens barrel, the vibration reduction mechanism may be fixed to the vibration reduction unit connected to the fixture barrel. Moreover, the lens barrel may preferably include an angle setting means for setting the mutual angular position around the optical axes of the fixture barrel and the vibration reduction unit housing. Even if the vibration reduction lens barrel is disassembled and reassembled after setting and adjusting the rotational positions of the vibration sensor and the vibration reduction mechanism, this structure can ensure the reproducibility without varying the rotational position.

BRIEF DESCRIPTION OF THE DRAWINGS

FIG. 15 is a cross-sectional view showing the vibration reduction lens barrel according to the fifth embodiment of the present invention;

DETAILED DESCRIPTION OF THE PREFERRED EMBODIMENTS

An embodiment of the present invention will be explained below with reference to the attached drawings.

Figure 7A:
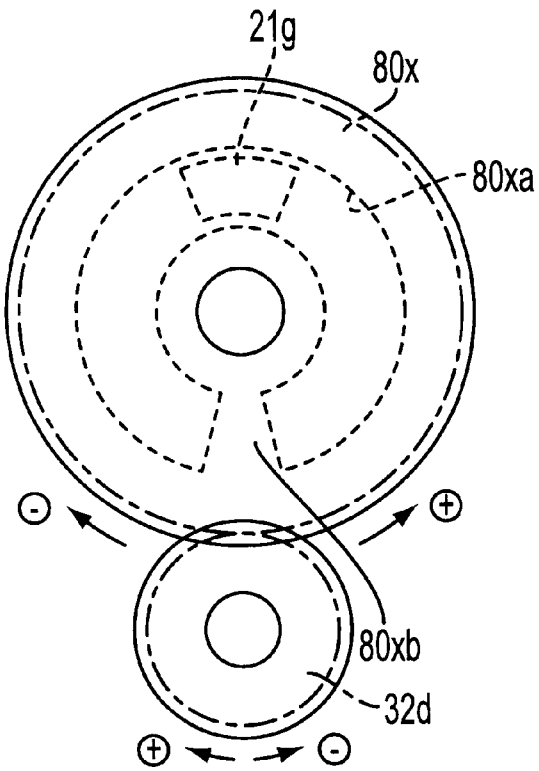
FIG. 7A is used for explaining an example of the limiting means which limits the variable range of the vibration reduction lens, and is an enlarged cross-sectional view showing the main portion indicated with the arrows VIIA and VIIB shown in FIG. 2.
Figure 7B:
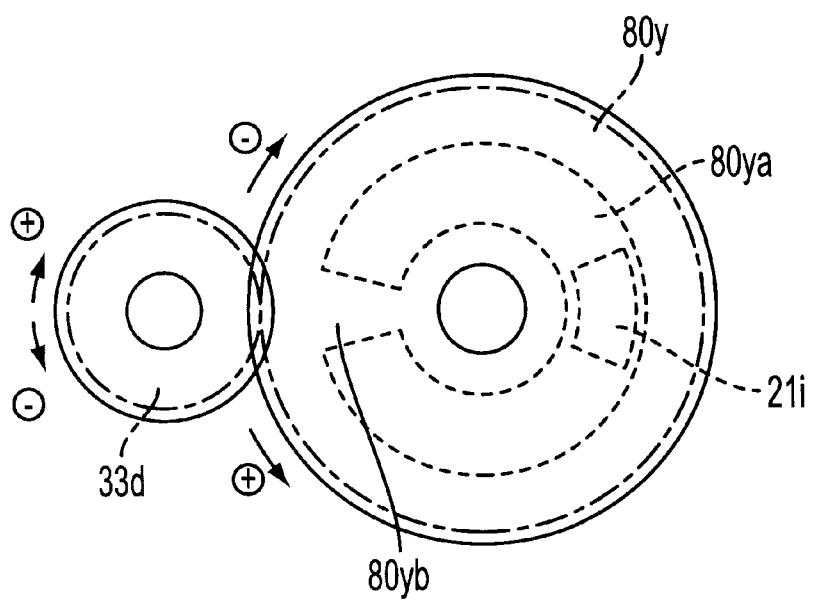
FIG. 7B is used for explaining an example of the limiting means which limits the variable range of the vibration reduction lens, and is an enlarged cross-sectional view showing the main portion indicating with the arrows VIIA and VIIB shown in FIG. 2.
Figure 8:
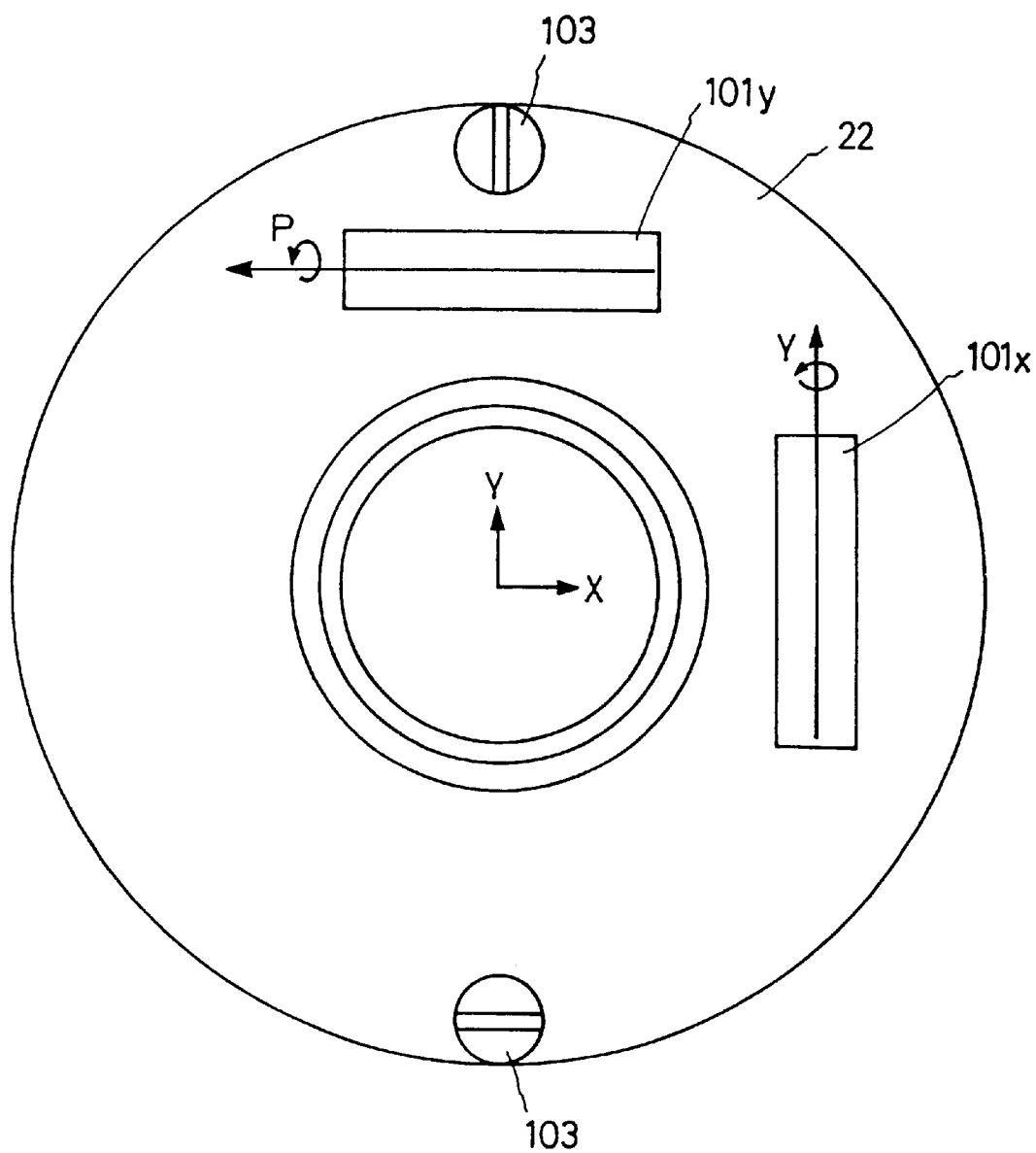
FIG. 8 is a side view showing schematically the main portion of the sensor substrate according to an embodiment of the present invention.
Figure 9:
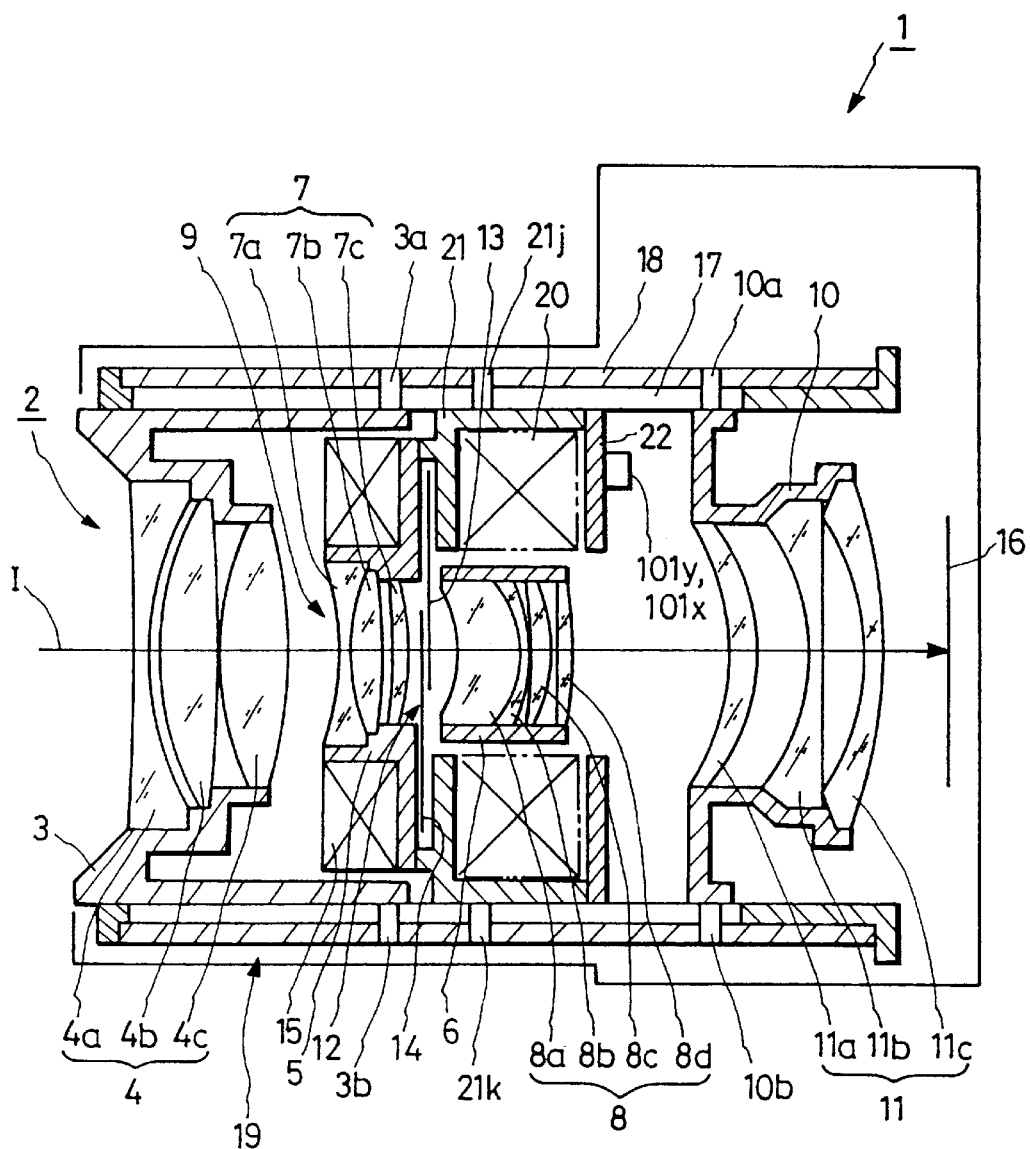
FIG. 9 is a structural view used for explaining the schematic structure of a camera with a lens shutter suitable for the vibration reduction apparatus according to the present invention.

FIGS. 1 to 9 show the vibration reduction apparatus of the first embodiment according to the present invention. Referring now to FIG. 9, the general structure of a camera having a photographing lens system with a lens shutter suitably embodying the present invention will be described in detail.

In the entire camera represented with the numeral 1, the photographing lens system 2 being a main optical system includes a first lens group 4, front and rear lens groups 7 and 8, a second lens group 9, and a third lens group 11 to construct a zoom lens.

The first lens group 4 is constructed by holding three lenses 4a, 4b, and 4c in the lens frame 3. The second lens group 9 is formed of seven lenses in total: three lenses 7a, 7b and 7c held in the lens frame 5 and four lenses 8a, 8b, 8c and 8d held in the lens frame 6. The third lens group 11 is formed of three lenses 11a, 11b, and 11c held in the lens frame 10.

In the figure, numeral 12 represents a lens shutter. The lens shutter 12 is arranged between the front lens group 7 and the rear lens group 8 of the second lens group 9. The shutter drive unit 15 is arranged on the outer region of the lens frame 5 for the front lens group 7 of the second lens group 9. The shutter curtains 13 and 14 are arranged just in front of the rear lens group 8 functioning as an image blur reduction lens (to be described later).

Moreover, in the figure, numeral 16 represents the imaging surface of a film on which a subject image is focused by means of the first, second, and third lens groups 4, 9, and 11 which constitute the photographing lens system 2. Letter I represents the optical axis of the photographing lens system 2.

In the figure, numeral 17 represents a straight guide barrel constituting the lens barrel 19 in the photographing lens system 2, and 18 represents a zoom cam barrel 18. The straight guide barrel 17 is fixed to the camera body (the rear body) (not shown).

Furthermore, in the figure, numerals 3a and 3b represent cam-follower pins for the lens frame 3; 21j and 21k represent cam-follower pins for the substrate 21 (to be described later); and 10a and 10b represent cam-follower pins for the lens frame 10. These cam follower pins, as well-known, move the lens frames 3 and 10 or the substrate 21 only in the direction of the optical axis of the photographing system 2 within the guide barrel 17 and the zoom cam barrel 18.

According to the present embodiment, in the photographing lens group 2 having the three lens groups 4, 9, and 11, the rear lens group 8 of the second lens group 9 is shifted and moved as an image blur reduction lens on the plane perpendicular to the optical axis I. As shown in FIGS. 1 to 4, the image blur reduction mechanism 20 moves the image focused on the imagery surface 16 in accordance with the image blur condition.

As apparent from FIGS. 1 to 4, and FIG. 9, the image blur reduction mechanism 20 includes the rear lens group 8 of the second lens group 9 fixed and sustained to the lens frame 6. The substrate 21 on the side of the lens shutter 12 within the external space is used as a base member.

As apparent from FIGS. 1 to 4, in the image blur reduction mechanism 20, the rear lens group 8 (hereinafter, referred to the vibration reduction lens 8) is sustained inside the lens frame 6. The flange portion 6a is arranged at the portion facing the opening 21a of the substrate 21 on the outer region of the lens frame 6.

Figure 4:
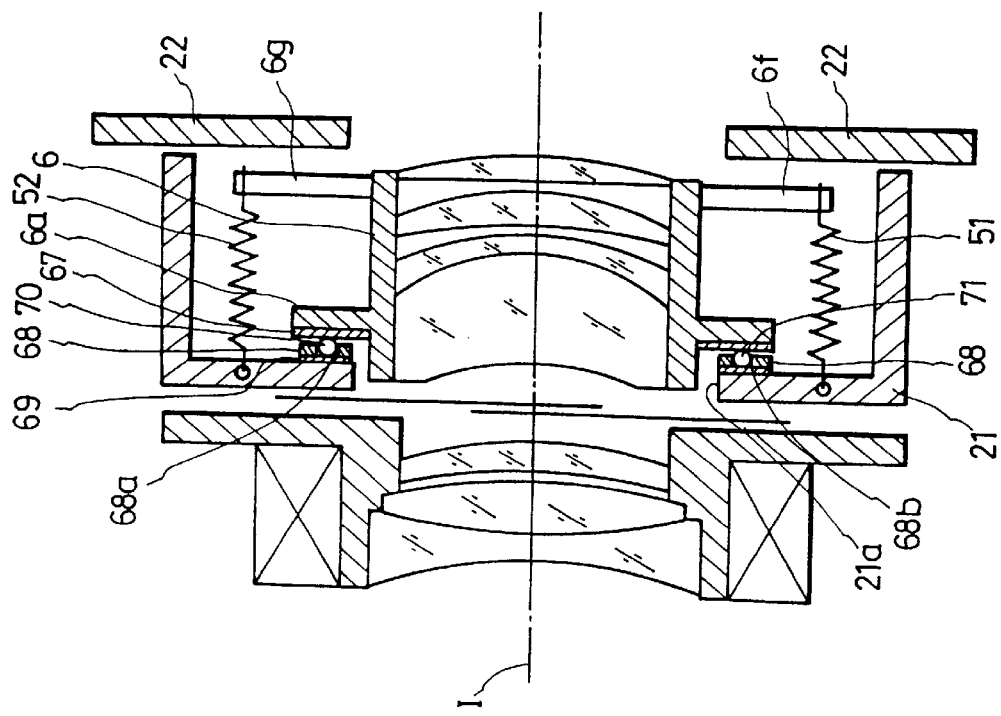
FIG. 4 is a cross-sectional view taken along the line IV—IV shown in FIG. 2.

The vibration reduction lens 8, as shown in FIG. 4, is shifted and guided using the guiding means on the plane perpendicular to the optical axis I of the photographing lens system 2.

Figure 2:
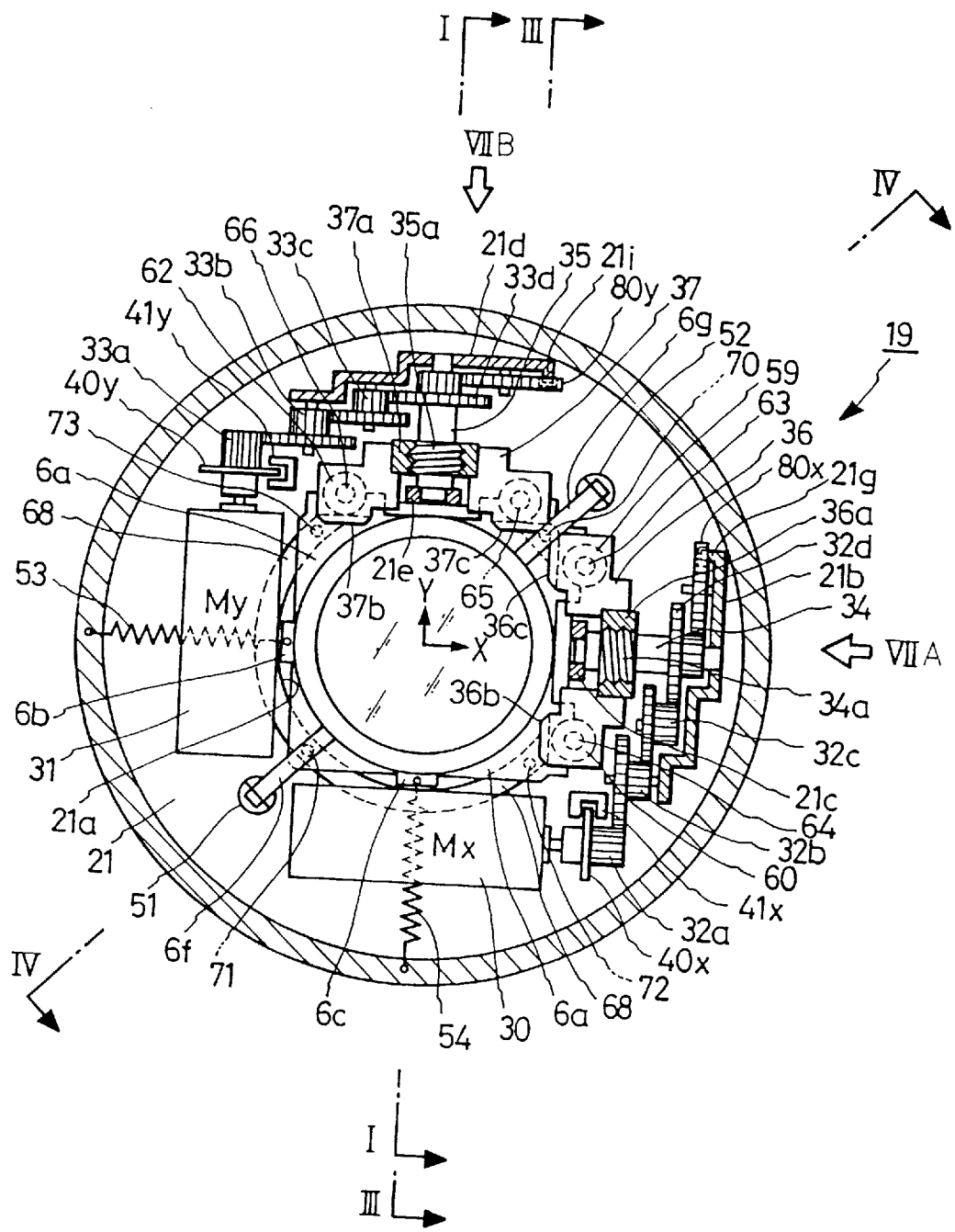
FIG. 2 is a horizontal cross-sectional view showing the image blur reduction mechanism inside a camera lens barrel being an embodiment of the vibration reduction apparatus according to the present invention.
Figure 5:
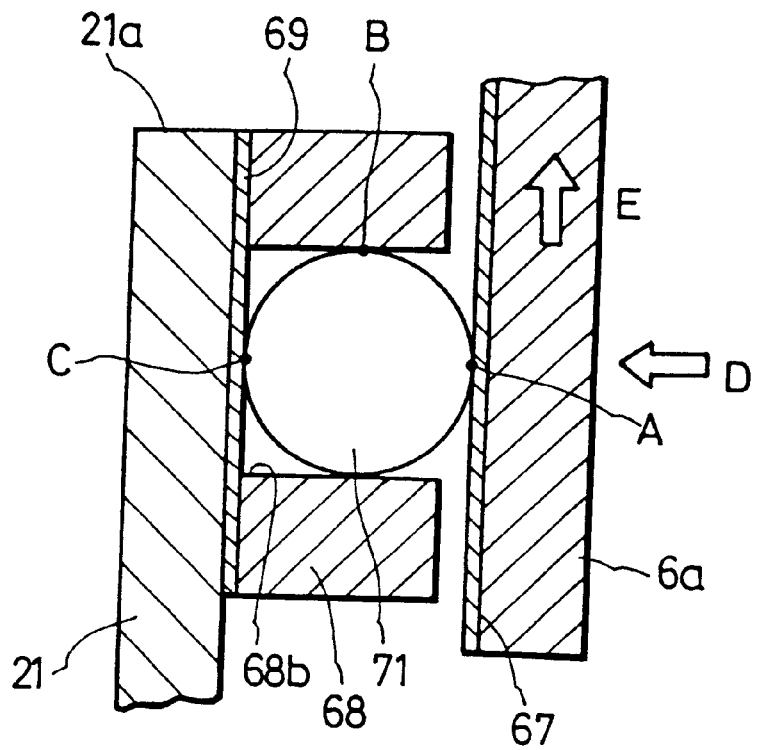
FIG. 5 is an enlarged cross-sectional view showing the main portion of the supporting structure of a vibration reduction lens.

As apparent from FIGS. 2 and 5, the seating members 67 and 69 of high hardness material such as hardened steel are arranged at the portion facing the flange portion 6a and the substrate opening 21a. The seating members 67 and 69 receive balls (steel balls) 70, 71, 72, and 73 which are positioned and held in accordance with the opening in the retainer member 68. The balls 70, 71, 72, and 73 are sandwiched between the seating members 67 and 69 to be held and fixed. The lens frame 6 is movable in the opening 21a of the substrate 21 via the flange portion 6a, the seating member 67, and the balls 70 to 73.

The through holes 68a and 68b in which the balls 70, 71, 72, and 73 are sustained rotatably therein are formed circumferentially and evenly in the retainer member 68.

As for the lens frame 6, springs 51 and 52 are bridged between the arm portions 6f and 6g arranged partially to the outer region and the substrate 21. This structure allows the seating members 67 and 69 of high hardness material such as hardened steel fixed to the flange portion 6a to be always in contact with the balls 70 to 73.

In such a structure, the vibration reduction lens 8 is movably supported on the plane perpendicular to the optical axis I and with a light load. Since the vibration reduction lens 8 is biased always by means of the springs 51 and 52, there is no problem that the optical system is degraded due to the tilt of the vibration reduction lens 8.

FIG. 4 shows only two balls 70 and 71. However, as shown in FIG. 2, four balls including the balls 72 and 73 may be arranged around the opening 21a in the substrate 21 and between the flange portion 6a and the substrate 21.

In the detailed explanation of the above-structure with reference to the enlarged view shown in FIG. 5, the seating member 69 and the retainer member 68 are formed of a material such as fluoroplastic and phosphor bronze with low frictional characteristic or a surface-treated material with low frictional characteristic. Since the flange portion 6a of the lens frame 6 is biased in the direction of the arrow D by means of the springs 51 and 52, the ball 71 is always in contact with the seating members 67 and 69 at the points A and C.

When the lens frame 6 is moved in the direction of the arrow E, the ball 71 first contacts with the inner wall of the opening 68b in the retainer member 68 at the point B. However, since the friction is low at the points B and C, the ball 71 rotates in the opening 68b of the retainer member 68.

FIG. 4 shows only two balls 70 and 71. However, as shown in FIG. 2, four balls including the balls 72 and 73 may be arranged around the opening 21a of the substrate 21 and between the flange portion 6a and the substrate 21.

The vibration reduction lens 8 is movable on the plane perpendicular to the optical axis I and with a light load. Since the vibration reduction lens 8 is biased by means of the springs 51 and 52, there is no problem that the performance of the optical system is degraded due to the tilt of the vibration reduction lens 8.

Referring to FIG. 2, numeral 30 represents an X-axis DC motor (shown with Mx), or a drive means which moves the image blur reduction lens 8 in the X-axis direction and numeral 31 represents a Y-axis DC motor (shown with My), or a drive means which moves the image blur reduction lens 8 in the Y-axis direction. The motors 30 and 31 are fixed on the side of the substrate 21.

Numeral 32 represents a rotational transmission gear chain which is formed of gears 32a, 32b, 32c, and 32d which transmits the drive force of the motor 30, and numeral 33 represents a rotational transmission gear chain which is formed of gears 33a, 33b, 33c, and 33d which transmits the drive force of the motor 31. The rotation of the gear chain 32 is transmitted to the first shaft 34 while the rotation of the gear chain 33 is transmitted to the second shaft 35. The first shaft 34 extending in the X-axis direction is supported rotatably on the shaft seating portion 21b and 21c arranged on the substrate 21. The second shaft 35 extending in the Y-axis direction is supported rotatably on the shaft seating portion 21d and 21e arranged on the substrate 21.

The gears 32b and 32c constituting the gear chain 32 transmitting the rotation of the motor 30 are fixed on the substrate 21b. The gears 33b and 33c constituting the gear chain 33 transmitting the rotation of the motor 31 are fixed on the substrate 21d. The gears 32d and 33d are rotatably mounted on the shafts 34 and 35, respectively.

Numeral 36 represents an X-axis movable member and 37 represents a Y-axis movable member. In the movable members, the female threaded portion 36a is screwed to the male threaded portion 34a of the shaft 34. The female threaded portion 37a is screwed to the male threaded portion 35a of the shaft 35. Thus, a movement producing mechanism is constituted as a drive mechanism where the feeding screw mechanism travels the lens frame 6 in the X-axis direction via the movable member 36 and in the Y-axis direction via the movable member 37.

Moreover, the guide member 55 is fixed on the variable member 36 so as to be adjacent to the female screw member 36a. The guide member 56 is fixed on the variable member 37 so as to be adjacent to the female screw member 37a. As apparent from FIG. 1, the guide member 55 is guided along the guide shaft 57 which is fixed to the bearing portion 21b or 21c of the substrate 21 and in parallel to the shaft 34. The guide member 56 is guided along the guide shaft 58 which is fixed to the bearing portion 21d or 21e of the substrate 21 and in parallel to the shaft 35. The movable member 36 is moved in the X-axis direction by means of the motor 30 while the movable member 37 is moved in the Y-axis direction by means of the motor 31.

Figure 1:
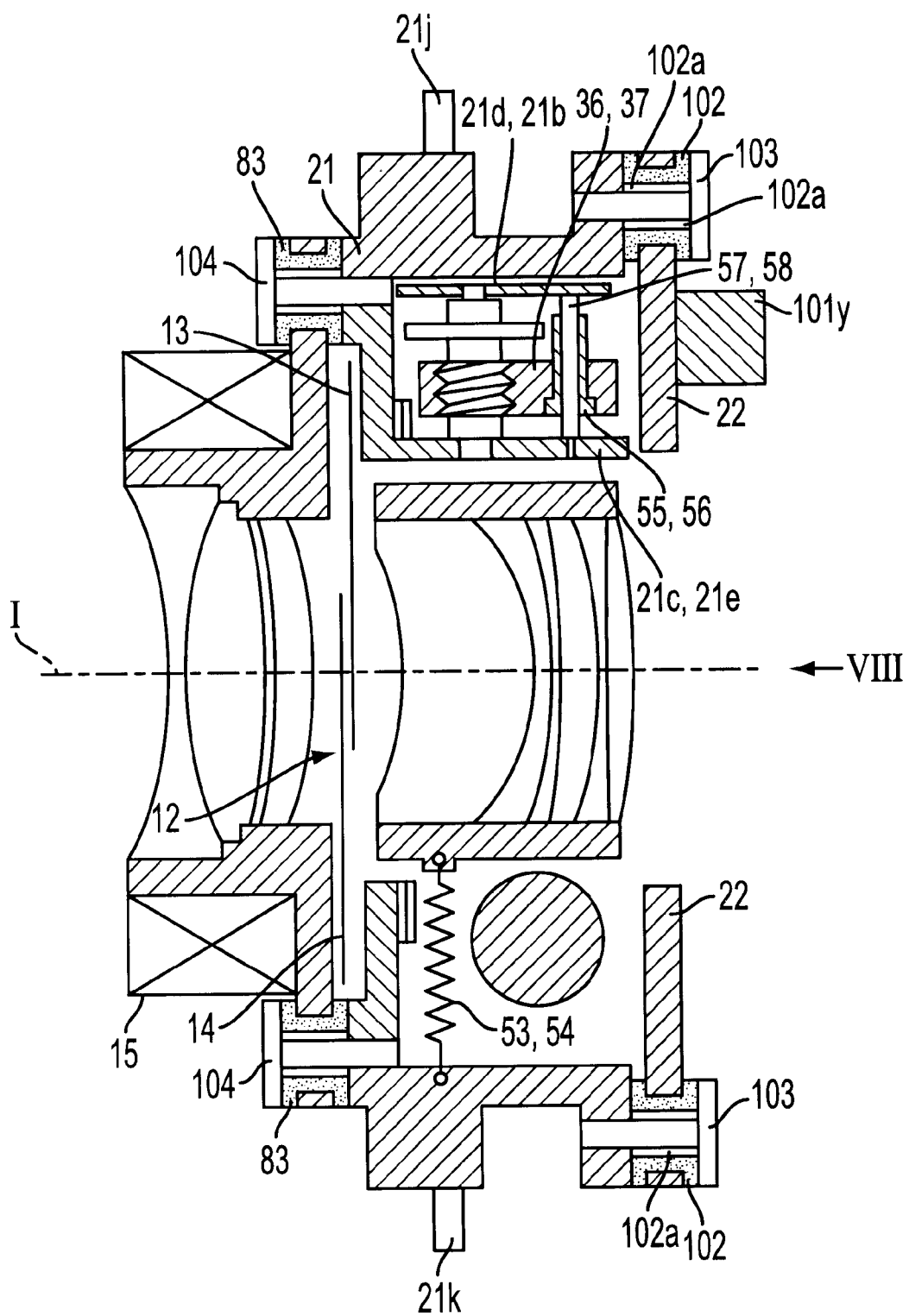
FIG. 1 shows an embodiment of the vibration reduction apparatus according to the present invention, and is a schematic vertical cross-sectional view showing the image blur reduction mechanism acting as a part of the main lens barrel of a camera.
Figure 3:
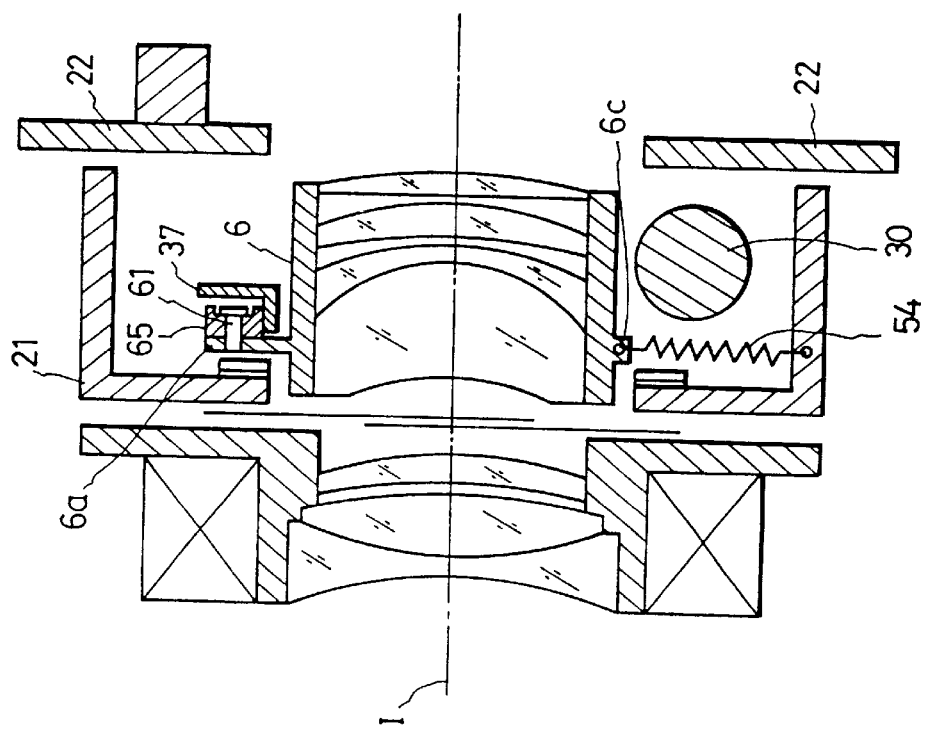
FIG. 3 is a cross sectional view taken along the line III—III shown in FIG. 2.

As seen clearly in FIGS. 2 and 3, the rollers 59, 60, 61, and 62 mounted on the flange portion 6a of the lens frame 6 can be rotated with the roller shafts 63, 64, 65, and 66. Moreover, as shown in FIGS. 1 and 3, the spring 53 is bridged between the spring engaging portion 6b on the opposite side of rollers 59 and 60 of the lens frame 6 and the substrate 21, substantially in the X-direction of the movement of the movable member 36. The spring 54 is bridged between the spring engaging portion 6c on the opposite side of the rollers 61 and 62 and the substrate 21, substantially in the Y-direction of the movement of the movable member 37.

The rollers 59 and 60 are biased by means of the spring 53 to be in contact with the contact portions 36b and 36c with a roughly L-shaped cross-section at both ends of the variable members 36. The rollers 61 and 62 are biased by means of the spring 54 to be in contact with the contact portions 37b and 37c with a roughly L-shaped cross-section at the both ends of the variable members 37.

However, the vibration reduction lens 8 follows the X-axis motor 30, thus shifting in the movable direction (X-direction) of the movable member 36, but moves freely in the Y-direction. Similarly, the vibration reduction lens 8 follows the Y-axis motor 31, shifting in the movable direction (Y-direction) of the movable member 37, but moves freely in the X-direction.

As apparent from the above-mentioned matter, the vibration reduction lens 8 can be shifted omnidirectionally within the opening formed in the substrate 21.

The spring 53 biases the lens frame 6 substantially in the X-axis direction or in the movable direction of the movable member 36 to have the lens frame 6 in contact with the movable member 36. The spring 54 biases the lens frame 6 substantially in the Y-axis direction or in the movable direction of the movable member 37 to have the lens frame 6 in contact with the movable member 37. This structure allows the movement of the movable members 36 and 37 to be transferred certainly to the lens frame 6.

Furthermore, the bias force of the spring 53 can remove the looseness in the thrust direction of the shaft 34 as well as the looseness between the male threaded portion 34a of the shaft 34 and the female threaded portion 36a of the movable member 36. The bias force of the spring 54 can remove the looseness in the trust direction of the shaft 35 as well as the looseness between the male threaded portion 35a of the shaft 35 and the female threaded portion 37a of the movable member 37. Hence the drive forces of the motors 30 and 31 can be transmitted accurately and certainly to the vibration reduction lens 8.

This embodiment employs the mechanism where the drive forces of the motors 30 and 31 are transmitted to the movable members 36 and 37 via the screw mechanism, respectively. However, the present invention should not be limited only to the present embodiment. A cam mechanism, a lever, or similar elements, for example, can be substituted for the screw mechanism, or a mechanism for converting a rotational movement into a straight movement.

As apparent from FIGS. 2, 7A and 7B, the small gear 32d is meshed with the limiting gear 80x while the small gear 33d is meshed with the limiting gear 80y. The limiting gear 80x is journaled rotatably on the gear bearing portion 21b on the substrate 21 while the limiting gear 80y is journaled rotatably on the gear bearing portion 21d on the substrate 21.

These limiting gears 80x and 80y function as limiting means. The operation of the limiting gears will be described below with reference to FIGS. 7A and 7B.

FIG. 7A corresponding to the portion indicated with the arrow VIIA in FIG. 2 shows the relationship between the X-axis gear 32d and the limiting gear 80x. FIG. 7B corresponding to the portion indicated with the arrow VIIB in FIG. 2 shows the relationship between the Y-axis gear 33d and the limiting gear 80y.

The groove 80xa in a roughly C-shaped form is formed in the surface (on the side of the movable member 36 in FIG. 2) of the limiting gear 80x while the groove 80ya in a roughly C-shaped form is formed in the surface (on the side of the movable member 37 in FIG. 2) of the limiting gear 80y. A protruded portion 21g protruding from the gear bearing portion 21b is formed inside the groove 80xa and on the opposite side of the gear 32d. A protruded portion 21i protruding from the gear bearing portion 21d is formed inside the groove 80ya and on the opposite side of the gear 33d.

Hence, when the limiting gear 80x rotates bidirectionally a degree of less than 180°, the rib portion 80xb of the limiting gear 80*x* strikes the protruded portion 21*g*, whereby its rotation stops mechanically. When the limiting gear 80*y* rotates bidirectionally a degree of less than 180°, the rib portion 80*yb* of the limiting gear 80*y* strikes the protruded portion 21*i*, whereby its rotation stops mechanically.

In the structure shown in FIGS. 7A and 7B, when the protruded portion 21*g* is positioned in the middle of the groove 80*xa* of the limiting gear 80*x*, and the protruded portion 21*i* is positioned in the middle of the groove 80*ya* of the limiting gear 80*y*, the vibration reduction lens 8 is set to the center position (to the position where the optical axis of the vibration reduction lens 8 agrees with the optical axis I), whereby the shift of the vibration reduction lens 8 agrees with the rotational angles of the limiting gears 80*x* and 80*y*. As a result, the shift of the vibration reduction lens 8 can be limited to a predetermined range.

Now, explanation will be made below as for the method for detecting the position and velocity of the vibration reduction lens 8.

Figure 6:
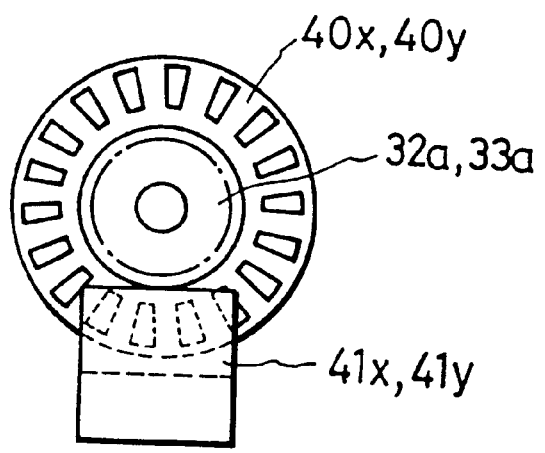
FIG. 6 is an enlarged cross-sectional view used for explaining means for detecting the position of the vibration reduction lens.

As shown in FIGS. 2 and 6, using the disc 40*x* mounted integrally to the gear 32*a* and having plural holes punched on its fringe portion with a uniform spacing as well as a photo-interrupter 41*x* arranged between the fringe portion and the substrate 21, the rotational angle of the X-axis motor 30 is detected. The rotational angle of the Y-axis motor 31 is detected by using the disc 40*y* mounted integrally to the gear 33*a* and having plural holes punched on its fringe portion with a uniform spacing as well as a photo-interrupter 41*y* arranged between the fringe portion and the substrate 21.

In other words, the photo-interrupter 41*x* detects and counts as pulse signals the number of the holes of the disc 40*x* to detect the position and the velocity, while the photo-interrupter 41*y* detects and counts as pulse signals the number of the holes of the disc 40*y* to detect the position and the velocity.

As shown in FIGS. 7A and 7B, according to the above-mentioned positional detection, when the gear 32*d* or 33*d*, for example, rotates in the direction of the (−) arrow, the vibration reduction lens 8 is shifted leftward and down in FIG. 2 to the limit position. The photo-interrupters 41*x* and 41*y* count pulses to detect the position, based on the limit position as an origin point. The velocity is calculated by detecting the rate of the pulses.

An encoder, which is formed of the disc 40*x* with punched holes and the photo-interrupters 41*x*, is mounted on the output shaft of the motor 30 while an encoder, which is formed of the disc 40*y* with punched holes and the photo-interrupters 41*y*, is mounted on the output shaft of the motor 31. The limiting gear 80*x* is mounted via the reduction gear chain 80*x* while the limiting gear 80*y* is mounted via the reduction gear chain 80*y*. Hence, the structure can detect the operational limit position and operational degree of each of the limiting gears 80*x* and 80*y* with high resolution.

Furthermore, a single limiting gear can limit the shift range of the vibration reduction lens 8 to a predetermined value by setting the operational and rotational angle of each of the limiting gears 80*x* and 80*y* to a small angle of less than 360°.

Apart from the limiting gears 80*x* and 80*y*, since the vibration reduction lens 8 is driven via the feeding screw mechanism, or a movement producing mechanism, it can be limited with high accuracy to a predetermined range, without burdening it directly with a load.

According to the image blur reduction mechanism 20 of the present invention, as apparent from FIGS. 1, 3, 8, and 9 in order to move the vibration reduction lens 8 over the plane perpendicular to the optical axis I, the substrate (sensor substrate) 22 on which the vibration detecting sensor (angular velocity sensor 101*x*, 101*y*) acting as a vibration condition detecting means is mounted in the lens barrel 19 (or on the image surface side of the image blur reduction mechanism 20 in the present invention) including the vibration reduction lens 8. The drive mechanism is assembled with screws 103.

In the present invention, the angular velocity sensors 101*y* and 101*x* are used as vibration detecting sensors. As apparent from FIG. 8, the sensors 101*y* and 101*x* detect the angular velocity around the pitching axis and the yawing axis of a camera, respectively.

In the detailed explanation, the shift in the Y-axis direction of the vibration reduction lens is controlled in accordance with the output around the pitching axis of the sensor. Similarly, the shift in the X-axis direction of the vibration reduction lens is controlled in accordance with the output around the yawing axis of the sensor. FIG. 8 shows the pitching axis P and the yawing axis Y.

If the X-axis of the image blur reduction mechanism 20 is not aligned with the yawing direction, or the angular velocity detecting direction while the Y-axis is not aligned with the pitching direction, or the angular velocity detecting direction, vibration cannot be prevented with good accuracy.

It is considered that the right angle between the shift in the X-axis direction and the shift axis in the Y-direction of the image blur reduction mechanism 20 is perfectly set because the components are formed of mechanically-processed parts or molded parts.

Similarly, the right angle made by the sensitivity axes of the two angular velocity sensors 101*x* and 101*y* mounted on the substrate 22 can be ensured. As for this respect, Japanese Patent Application No. 5-105735, filed by the present applicant, discloses the method which can ensure such accuracy. Hence, the detailed explanation thereof will be omitted here.

The angular velocity sensors 101*x* and 101*y* which are mounted on the substrate 22 with the sensitivity axes maintained at a right angle are thus mounted on the substrate 21 mounting the image blur reduction mechanism 20 using screws 103. Hereinafter, the substrate 22 on which the angular velocity sensors 101*x* and 101*y* are mounted with each of the sensors 101*x* and 101*y* acting as a vibration detecting sensor is called a sensor substrate.

The sensor substrate 22 has mounting holes in long opening shapes therein which are used to adjust the X-direction of the image blur reduction mechanism 20, the yawing direction and Y-axis direction of the angular velocity sensor, and the Y-axis direction, and the pitching direction of the angular velocity sensor.

As shown in FIG. 8, the X-axis direction is aligned with the yawing direction while the Y-axis direction is aligned with the pitching direction. Then the image blur reduction mechanism 20 and the sensor substrate 22 are integrally combined as a unit using screws 103.

In FIG. 8, two mounting screws are used for the brief explanation. Needless to say, three or four screws may be used to assemble securely and safely the sensor substrate 22.

The sensor substrate 22, as apparent from FIG. 1, is mounted onto the substrate 21 on the side of the image blur reduction mechanism 20 via a buffer member 102. This structure prevents minute vibration of the image blur reduction mechanism 20 from propagating to the sensor substrate 22. The above-mentioned elements are integrated as a unit.

In this case, a clearance 102*a* is formed within the buffer member 102 and used to align adjustably the angular velocity detecting direction of the sensor substrate 22 with the shift direction of the vibration reduction lens 8.

Furthermore, according to the present embodiment, the lens shutters 13 and 14 and the drive mechanism 15 (hereinafter, referred to the lens shutter 12) are securely screwed to the image blur reduction mechanism 20 via the buffer member 83 using the screws 104, whereby a larger unit is constructed.

The buffer member 83 prevents the vibration at a shutter operating time from propagating to the vibration reduction lens 8 of the image blur reduction mechanism 20 and the sensor substrate 22.

As described above, according to the present invention, the lens shutter 12, the image blur reduction mechanism 20, and the sensor substrate 22 are integrally connected to make a unit.

A diaphragm, of course, may be used instead of the lens shutter 12.

According to the vibration reduction mechanism 20 having the above-structure, the image focused on the imagery surface 16 can be moved in a desired state by shifting the rear lens group (vibration reduction lens) 8 in the second lens group 9 (shown in FIG. 9) in the direction perpendicular to the lens optical axis I, whereby image blur can be prevented.

Moreover, according to the image blur reduction mechanism 20, the DC motors 30 and 31 each with relatively large volume can be arranged in such a manner that the longitudinal direction is perpendicular to the optical axis I of the photographing lens group 2. As apparent from FIGS. 2 and 3, the DC motors 30 and 31 can be built in the outer area of the lens frame 6 for the vibration reduction lens 8, without having the DC motors 30 and 31 protrude in front of the lens shutter 12 and the third lens group 11, to integrate the lens barrel into a compact unit with high density. Hence this structure has an advantage in view of the structure and assembly.

Therefore, according to the image blur reduction mechanism 20, the space for the lens shutter 12 and the clearance between the second lens group 9 and the third lens group 11 can be ensured. In addition, this simple component integrating process enables easiness of good assembly. For example, it is very effective to arrange the image blur reduction mechanism adjacent to the diaphragm mechanism in the exchangeable photographing lens.

In the above construction, the first and second motors 30 and 31 are arranged in the ring-shaped space formed by the outer region of the lens frame 6 for the vibration reduction lens 8 in such a manner that they are shifted in the peripheral direction to the first and second movable members 36 and 37, which are arranged movably in the space, respectively and the longitudinal directions are perpendicular to the optical axis I. Hence, the simplified mechanism allows the DC motors 30 and 31 acting as drive means to be arranged without having them protrude outward. Moreover, there is an advantage in that the vibration reduction mechanism 20 can be integrated as a unit which enables the space saving and reduced manufacturing cost.

The feature becomes more remarkable in the case where the output shafts of the motors 30 and 31 are arranged in the X- and Y-axis directions, respectively, and the first converting means, which is constituted of the first shaft 34 and the first movable member 36, converts the rotation force into a straight movement via the gear chain 32. At the same time, while the second converting means which is constituted of the second shaft 35 and the second movable member 37 converts the rotation force into a straight movement via the gear chain 33.

Moreover, the vibration reduction mechanism 20 is constituted of a small housing member as a unit including the substrate 21 and the sensor substrate 22 in the ring-shaped space defined by the peripheral region of the lens frame 6 for the vibration reduction lens 8. Hence, the above structure is very effective where other complicated mechanism such as the lens shutter 12 shown in FIG. 9 must be arranged in a compact manner.

Figure 10:
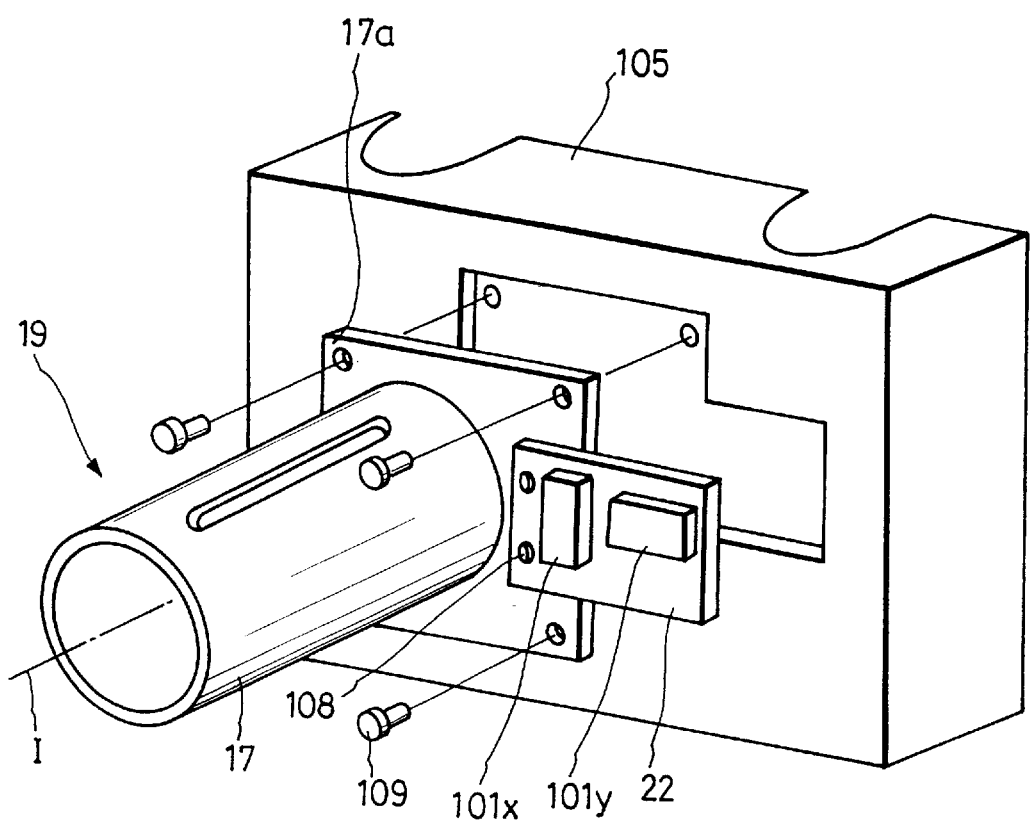
FIG. 10 is a perspective view showing schematically the second embodiment according to the present invention.

FIG. 10 shows the vibration reduction mechanism according to the second embodiment of the present invention. Like numerals are attached to the same or similar elements as to those in the first embodiment. Hence duplicate explanation will be omitted here.

Referring to FIG. 10, the photographing lens group 2 (not shown) and the image blur reduction mechanism 20 (not shown) are housed inside the straight guide barrel 17. The lens barrel 19 is formed by inserting the cam (not shown) into the outer peripheral region of the straight guide barrel 17.

The flange 17*a* being a flat portion perpendicular to the optical axis I of the straight guide barrel 17 is integrally formed with the straight guide barrel 17.

The cam barrel is rotated around the optical axis I to move the lens groups forward and backward, but the straight guide barrel 17 is stationary to the camera body.

In the figure, numeral 22 represents a sensor substrate where the angular velocity sensor 101*x* which detects yawing and the angular velocity sensor 101*y* which detects pitching are mounted to be perpendicular to each other.

In this embodiment, the sensor substrate 22 is rotatably adjusted around the shaft in parallel to the optical axis I and securely fixed to the flange 17*a* of the straight guide barrel 17 constituting the lens barrel 19, using the screws 108.

The sensor substrate 22 on which the angular velocity sensors 101*x* and 101*y* are mounted is integrally assembled as a unit with the lens barrel 19 including the straight guide barrel 17.

The camera body (front body) 105 is securely fixed with the flange 17*a* of the straight guide barrel 17 using screws 109.

After the cam barrel (not shown) has been inserted externally to the straight guide barrel 17, the screws 108 are loosened. Then, the X- and Y-axis shift directions of the vibration reduction lens 8 within the straight guide barrel 17 as well as the angular velocity detection direction of each of the angular velocity sensors 101*y* and 101*x* are adjusted by rotating the sensor substrate 22 around the shaft in parallel to the optical axis I. When the shift direction is aligned with the angular velocity detecting direction, the adjustment is completed by tightly re-screwing the screws 108.

As described above, in this embodiment, a single barrel unit is formed of the straight guide units 17 and 17*a*, the sensor substrate 22, the cam barrel, and the photographing lens group.

The single barrel unit can align the X- and Y-axis shift directions of the vibration reduction lens 8 with the angular velocity detection direction of the sensor.

Figure 11:
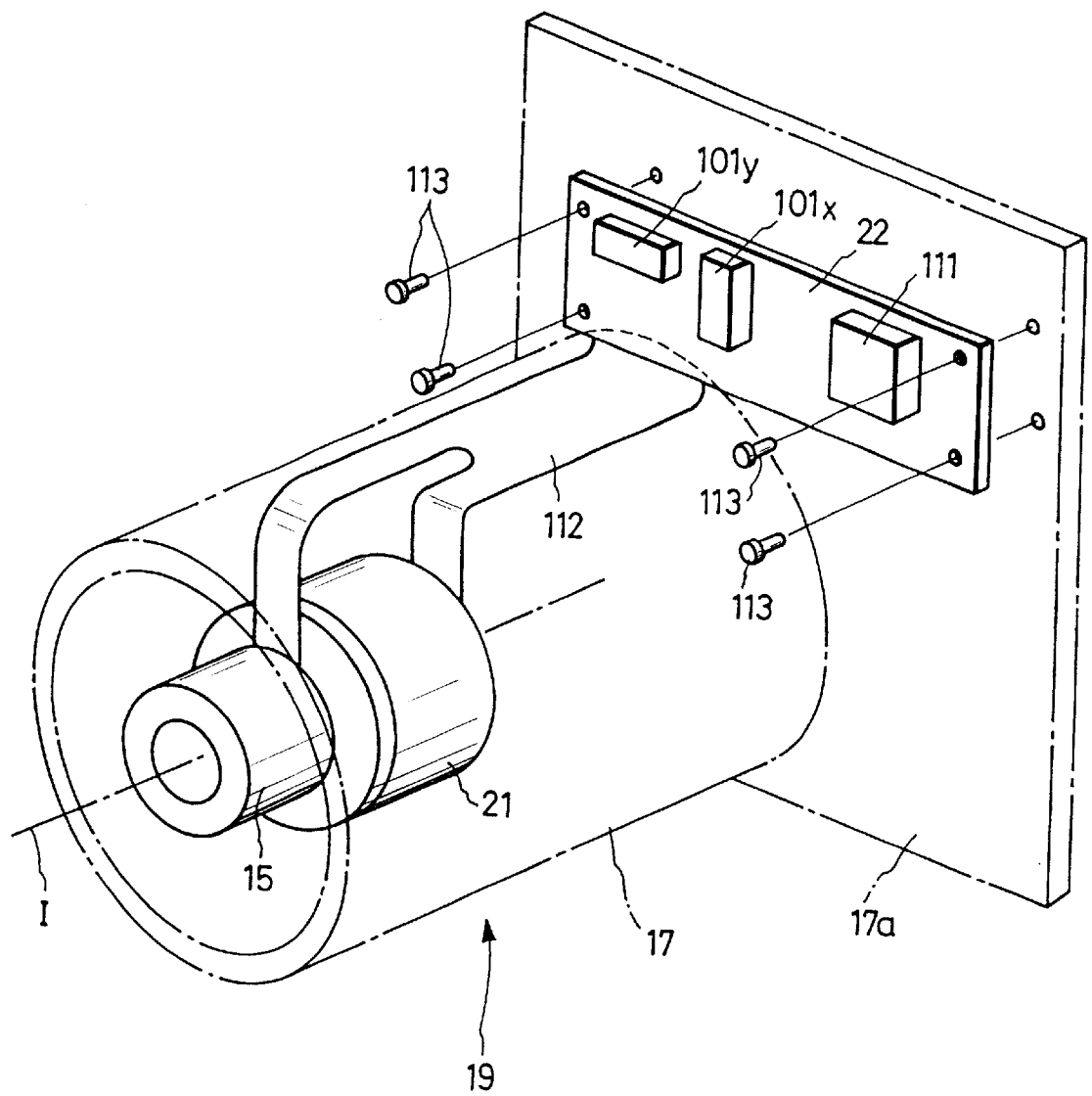
FIG. 11 is a perspective view showing schematically the third embodiment according to the present invention.

FIG. 11 shows the third embodiment according to the present invention. In FIG. 11, like numerals are attached to the same or similar elements as to those in the above-embodiments. Hence duplicate explanation will be omitted here.

In the figure, numeral 112 represents a flexible printed board and 111 represents a shutter control circuit each acting as various control circuits.

The flexible printed board connects the shutter mechanism 15 and the substrate 21 on which the image blur reduction mechanism 20 is mounted with the sensor substrate 22.

The sensor substrate 22 on which a pair of the angular velocity sensors 101x and 101y are mounted to a part of the flexible printed board 112 derived from the image blur reduction mechanism 20 which drives and controls the vibration reduction lens 8. The substrate 22 is mounted rotatably and adjustably to the flange 17a of the straight guide barrel 17 constituting the lens barrel 19 or the flat portion of the front body 105. Thus the shift axis of the vibration reduction lens 8 can be aligned with the angular velocity detecting direction of the angular velocity sensors 101x and 101y.

The shutter mechanism 15 and the image blur reduction mechanism 20 are housed and arranged in the straight guide barrel 17 constituting the lens barrel 19 (shown with dashed lines) so as not to rotate around the optical axis I.

Moreover, in this embodiment, the shutter control circuit 111 is mounted on the sensor substrate 22, together with the angular velocity sensors 101x and 101y.

Instead of the shutter control circuit 111, various control circuits including an AF control circuit and a diaphragm (or Stop) control circuit can be used as the assembly component.

The vibration reduction drive control circuit assembled on the sensor substrate 22 can realize an integration as a complete unit, a size reduction and a low manufacturing cost.

Setting the angular velocity direction of the angular velocity sensor 101x, 101y to the right angle is done similarly, as shown in the first and second embodiments.

In such a structure, the sensor substrate 22 is securely fixed with screws 113 over the plane perpendicular to the optical axis I, for example, over the plane perpendicular to the optical axis I of the flange 17a of the straight guide barrel 17 or the front body of a camera. Thus, the sensor substrate 22 is integrated with the image blur reduction mechanism 20 to form a unit.

An adjustment is done to align the angular velocity detecting direction of the angular velocity sensor with the shift direction of the vibration reduction lens 8.

The present invention should not be limited only to the structure of the above-mentioned embodiment. Needless to say, the shapes and structures of various elements including the image blur reduction mechanism 20 can be varied and modified arbitrarily.

In the above embodiments, the case where the present invention is embodied in a camera with the lens shutter 12 has been described. However, the present invention should not be limited only to that embodiment. In conventional popular cameras, the vibration reduction lens which shifts perpendicularly to the optical axis I can be adopted to prevent an image blur due to a movement of a hand. Hence, the present invention does not depend on the structure of a camera body.

Furthermore, the vibration reduction apparatus according to the present invention can exhibit its capability in various optical instruments and devices, in addition to cameras with the above-mentioned structure.

As described above, the vibration reduction apparatus according to the present invention, includes a vibration reduction optical system which is moved over the plane perpendicular to the optical axis of the main optical system; and a drive mechanism which drives the vibration reduction optical system. The vibration detecting means is integrally mounted to a part of either the lens barrel assembling the vibration reduction optical system and the drive mechanism or the mechanism unit such as the front body of a camera. Hence, this simplified structure has the following excellent effects.

Since the sensor substrate on which the vibration detecting means is mounted has a unit structure integrally combined with the vibration reduction mechanism, the shift direction of the vibration reduction optical system in the vibration reduction mechanism can be aligned easily and certainly with the direction of the sensitivity axis of the vibration detecting means. This structure has an excellent feature in that the vibration is prevented with good accuracy and a picture with no blur is photographed.

Moreover, the vibration reduction mechanism and the vibration detecting means are united together. Hence there is an advantage in that the unit interchangeability is ensured and the assembling easiness can be improved.

The lens barrel including the image blur reduction mechanism is combined with the sensor substrate to complete as a unit. Thus the shift direction of the vibration reduction lens can be aligned with the detection direction of the angular velocity sensor acting as a vibration detecting means by adjusting the lens barrel. This feature allows improved assembly and a unit interchangeability.

According to the present invention, the number of the assembling boards can be effectively reduced by mounting other function circuits, for example, a shutter control circuit, an AF control circuit, and a diaphragm control circuit, on the sensor substrate. Hence there is an advantage in that the manufacturing cost of a camera can be reduced.

Particularly, according to the present invention, two vibration detecting means for detecting two directions are mounted on a single substrate and the mutual sensitivity axes are previously oriented. Then the substrate is assembled to the vibration reduction optical system and the lens barrel having the drive mechanism to complete as a unit. Thus the direction of the shift axis of the vibration reduction optical system can be aligned with the direction of the sensitivity axis of the vibration detecting means by adjusting the direction of the substrate.

According to the procedure, the mounting directions of various sections in the vibration reduction mechanism can be adjusted easily. As a result, the system unification leads to the small-sized system and the vibration reduction mechanism with good accuracy can be realized.

Furthermore, according to the present invention, the substrate mounting the vibration detecting means is arranged to a part of the lens barrel including the image blur reduction mechanism in order to complete the entire system as a unit. Hence, in the assembly state before the mechanism unit is built into the camera body, there is an advantage in that the sensitivity of the vibration detecting means as well as the drive state of the vibration reduction optical system can be checked and adjusted easily and with certainty.

Next, the fourth embodiments will be explained below with reference to FIGS. 12 to 14.

Figure 12:
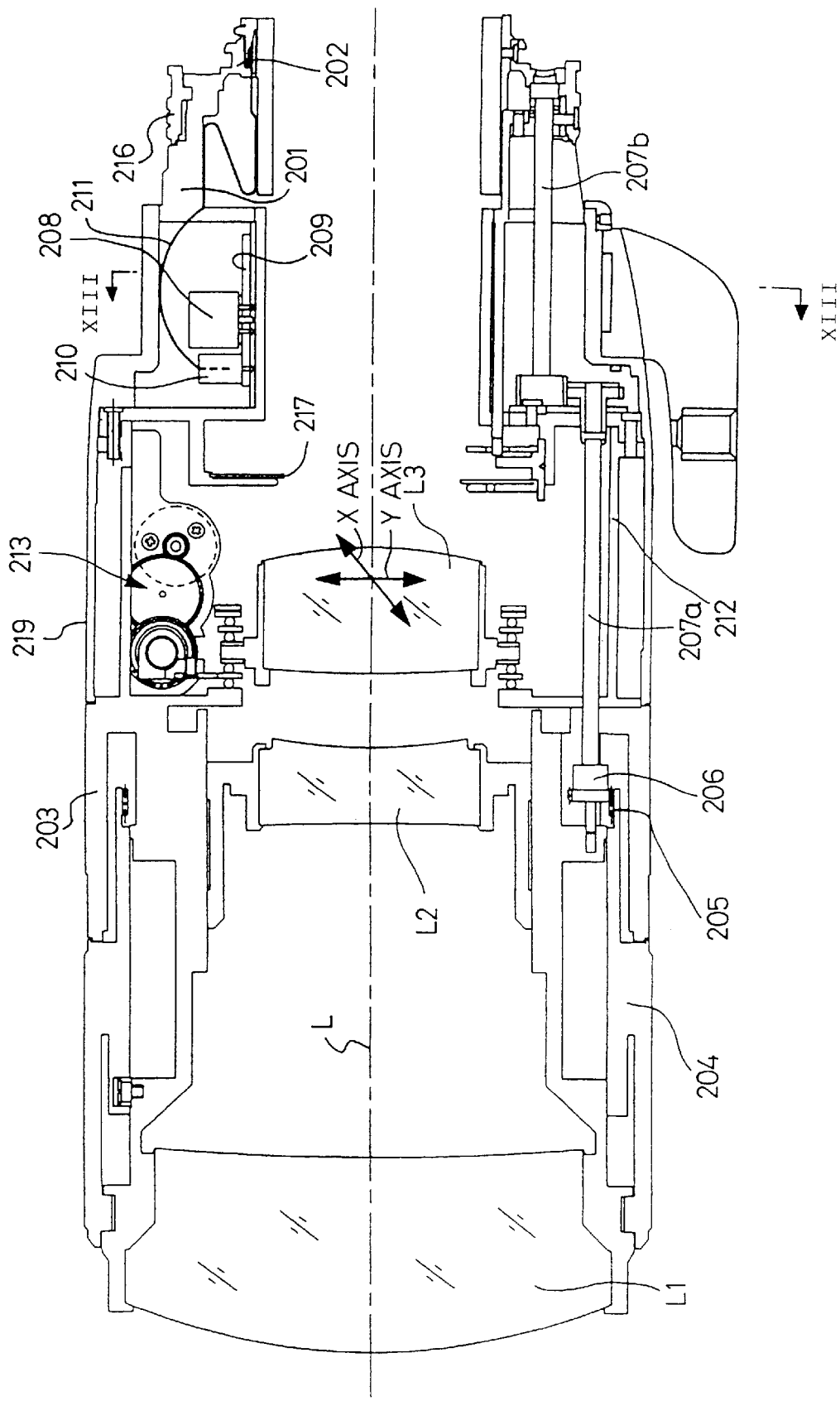
FIG. 12 is a cross-sectional view showing the vibration reduction lens barrel according to the fourth embodiment of the present invention.

FIG. 12 is a cross-sectional view showing the vibration reduction lens barrel according to an embodiment of the present invention. FIG. 13 is a cross sectional view taken along the line XIII—XIII shown in FIG. 12. FIG. 14 is a plan view showing the vibration sensor mounting portion.

The fixture barrel 201 is integrally fixed with the lens mount 202 connected to the mount of the camera body (not shown). The front fixture barrel 203 holding the fixture lens L1 is fixed in front of the optical axis of the fixture barrel 1. The focus ring 204 is rotatably mounted around the outer region of the front fixture barrel 203.

The focus ring 204 moves the focus lens L2 forward and backward along the optical axis by means of the lens drive mechanism (not shown) to perform its focus adjustment. The segment gear 205 is arranged on the rear end of the focus ring 204 and meshes with the pinion gear 204. The pinion gear 206 is motor-driven via the drive shafts 207a and 207b connected to the AF drive device (not shown) of the camera body. Hence, the focus lens L2 is moved by selecting the manual control by the focus ring 204 and the AF drive of the AF drive device.

The diaphragm ring 216, which is arranged on the outer periphery of the fixture barrel 201, can set the diaphragm stop of the diaphragm unit 217 arranged in front of the optical axis of the fixture barrel 201 via the interlock (not shown).

Figure 13:
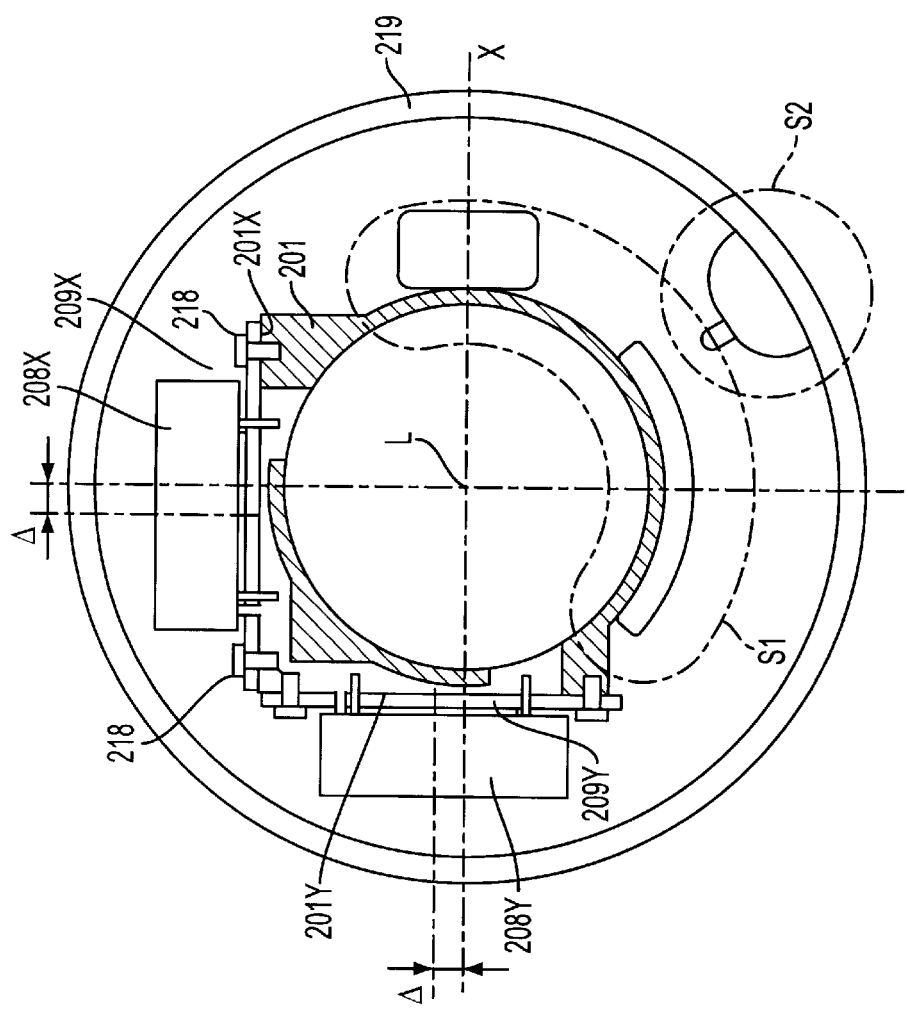
FIG. 13 is a cross-sectional view taken along the line XIII—XIII shown in FIG. 12.

As shown in FIG. 13, the angular velocity sensor 208, or a sensor which detects the vibration of the hand, includes the angular velocity sensor 208x which detects the angular velocity around the X-axis and the angular velocity sensor 208y which detects the angular velocity around the Y-axis. The angular velocity sensor 208 is fixed on the fixture barrel 201 through the substrate 209 of glass epoxy. Since the fixture barrel 201, as foregoing described, is integrally mounted with the lens mount 202, the upper and lower positions of the fixture barrel to the camera body, the positions of the angular velocity sensors 208x and 208y to the X-axis and Y-axis of the camera body can be set accurately.

The angular velocity sensor 208 is connected to the connector 210 fixed on the substrate 209. The connector 210 is connected to the vibration reduction control device (not shown) on the side of a camera body via the FPC (flexible printed circuit board) 211.

The vibration reduction unit housing 212 is mounted in front of the optical axis of the fixture barrel 201, and the vibration reduction mechanism 213 is fixed inside the housing 212. The vibration reduction mechanism 213 has a mechanism which moves the vibration reduction lens L3 substantially in the direction perpendicular to the optical axis L, based on the control signal from the vibration reduction control device on the camera body. The cover 219 covers the outer periphery of the vibration reduction mechanism 213.

Next, the method of mounting the angular velocity sensor 208 and adjusting the position thereof will be described below in detail.

As shown in FIG. 13, the fixture barrel 201 has two flat portions 201x and 201y of which the positions are perpendicular to each other on the outer peripheral surface. The substrate 209x on which the angular velocity sensor 208x is mounted is arranged on the flat portion 201x. The substrate 209y on which the angular velocity sensor 208y is mounted is arranged on the flat portion 201y. The substrates 209x and 209y are arranged so as to shift by a predetermined shift Δ toward the X- and Y-axes perpendicular to each other. The substrate 209x and 209y are shifted to ensure the space S1 in which the diaphragm is inserted and the space S2 in which the AF drive force transmission unit is inserted.

Figure 14:
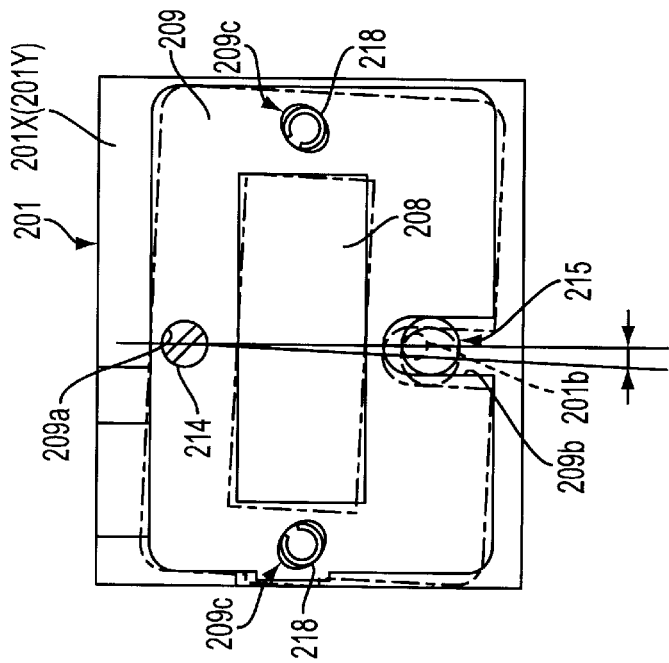
FIG. 14 is a plan view showing the mounting portion of a vibration sensor.

As shown in FIG. 14, the substrate 209 has the rotational center hole 209a formed therein through which the stepped rotational center screw 214 is inserted into the fixture barrel 201. The rotational center screw 214 is the rotational center at which the substrate 209 is rotated by an adjustment angle θ with respect to the fixture barrel 201.

The fixture barrel 201 has the tool hole 201b formed therein. The eccentric tool 215 is rotatably mounted in the tool hole 201b. The eccentric-cam portion, or the head of the eccentric tool 215, is engaged with the adjustment groove 209b formed in the substrate 209.

The substrate 209 has a longitudinal opening 209c therein which is positioned away from the elongated outer surface of the angular velocity sensor 208 and has an arc portion with the center of the rotational center hole 209a. The fixing screw 218 can be tightened to the fixture barrel 201 through the longitudinal opening 209c. The fixing screw 218 is arranged in the longitudinal direction of the angular velocity sensor 208 because distortion may be cause by tightening it in the sensitivity direction (upward and downward in FIG. 14).

The substrate 209 is rotated only by a desired adjustment angle θ with respect to the optical axis around the center of the rotational center screw 214 using the eccentric tool 215. Using the fixing screw 218, the substrate 209 is tightened to the fixture barrel 201 at the position at which the angular velocity sensor 208 produces its maximum output. Similarly, this adjustment is done to the angular velocity sensors 208x and 208y. The eccentric tool 215 may be pulled out after the fixture with the fixing screw 218, or may be kept as it is.

The fifth embodiment will be explained below with reference to FIG. 15 to 17C.

Figure 16:
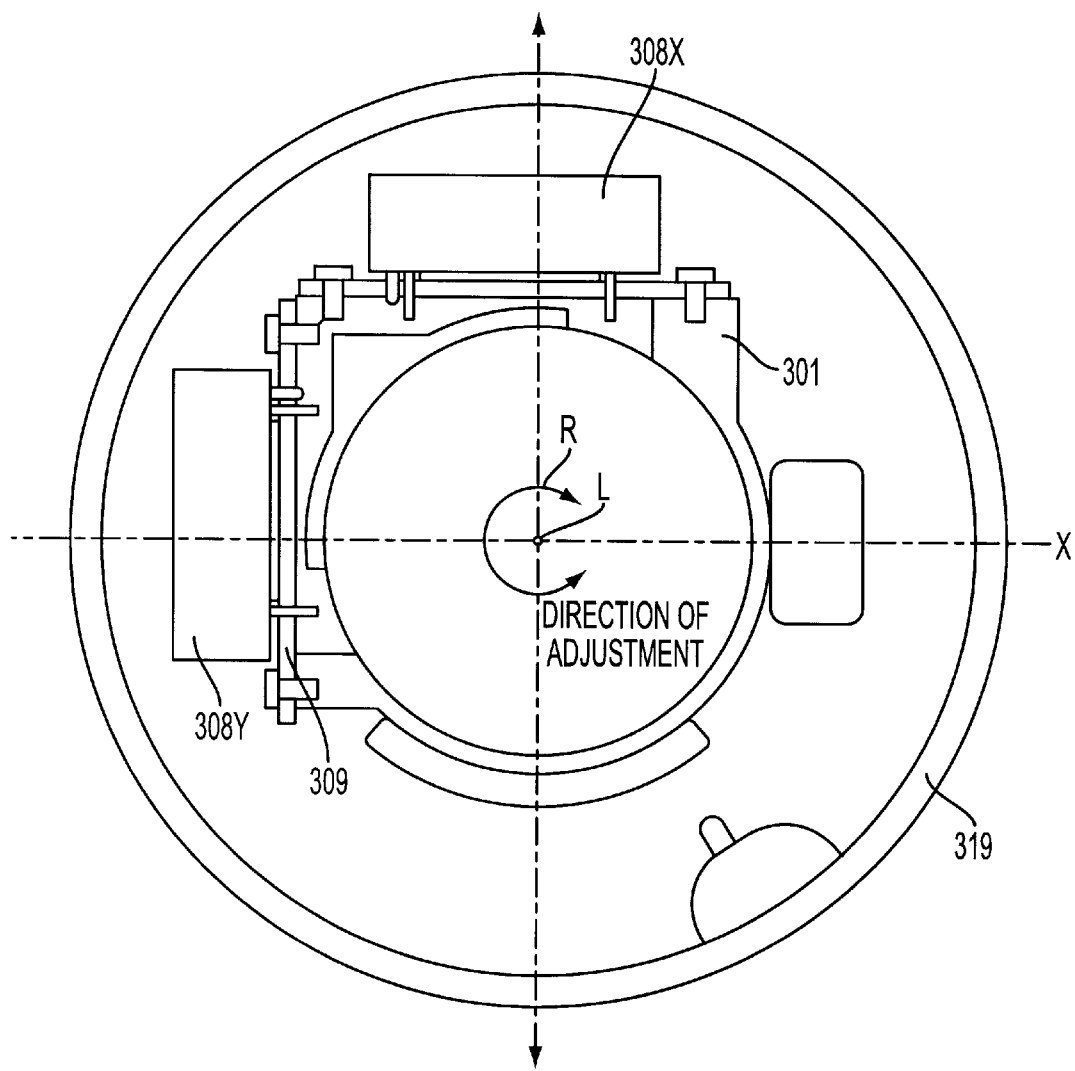
FIG. 16 is a cross-sectional view taken along the line XVI—XVI shown in FIG. 15.
Figure 17A:
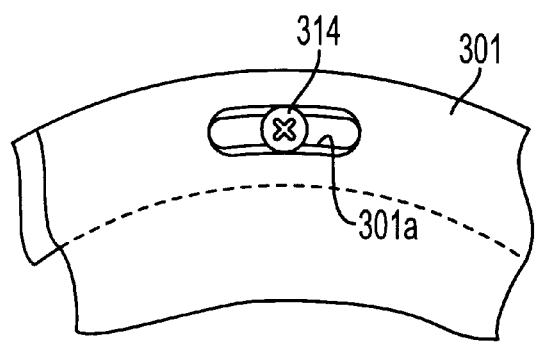
FIG. 17A is a detailed diagram showing the portion XVIIA shown in FIG. 15.
Figure 17B:
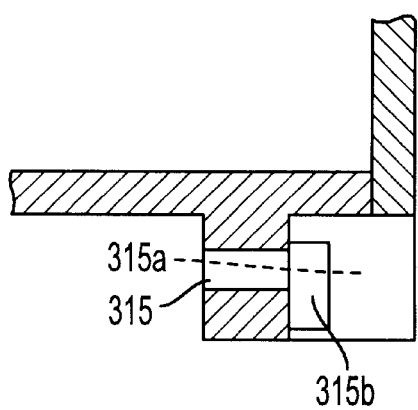
FIG. 17B is a detailed diagram showing the portion XVIIB shown in FIG. 15.
Figure 17C:
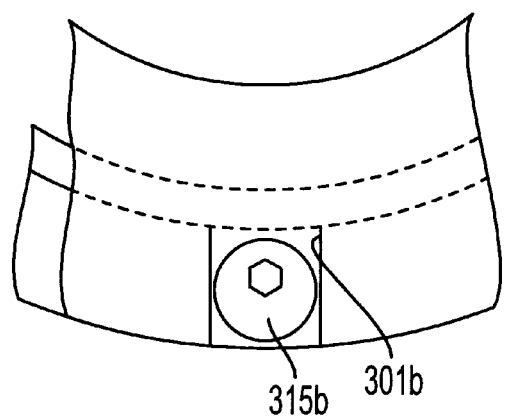
FIG. 17C is a detailed diagram showing the portion XVIIB shown in FIG. 15.

FIG. 15 is a cross-sectional view showing the vibration reduction lens barrel according to the embodiment of the present invention. FIG. 16 is the cross-sectional view taken along the line XVI—XVI shown in FIG. 15. FIG. 17A is the diagram showing in detail the portion XVIIA shown in FIG. 15. FIGS. 17B and 17C are diagrams each showing in detail the portion XVIIB shown in FIG. 15.

The fixture barrel 301 is integrally mounted to the lens mount 302 connected with the mount of the camera (not shown). The front fixture barrel 303 which holds the fixed lens L1 is mounted in the front of the optical axis of the fixture barrel 301. The focus ring 304 is rotatably mounted on the outer region of the front fixture barrel 303.

The lens moving mechanism (not shown) moves the focus ring 304 forward and backward along the optical axis L of the focus lens L2 to adjust the focus. The segment gear 305 is mounted on the rear end of the focus ring 304 so as to mesh with the pinion gear 306. The pinion gear 306 is driven be means of the motor equipped on the drive shaft 307 coupled to the AF drive device (not shown) in the camera body. Therefore, driving the focus lens L2 allows the focus ring 304 to select the manual operation or the motor drive operation by the AF drive device.

The diaphragm ring 316 is arranged on the outer region around the rear portion of the fixture barrel 301. The diaphragm stop of the diaphragm unit 317 arranged at the front region of the fixture barrel 301 along the optical axis can be adjusted via the interlock (not shown).

As shown in FIG. 16, the angular velocity sensor 308 which detects a movement of a holding hand includes the angular velocity sensor 308x that detects the angular velocity around the X-axis and the angular velocity sensor 308y that detects the angular velocity around the Y-axis. The angular velocity sensor 308 is fixed on the fixture barrel 301 via the substrate 309 of glass epoxy. Since the fixture barrel 301, as described above, is integrally fixed to the lens mount 302, the upper and lower positions of the camera body, the positions of the angular sensors 308x and 308y to the X-axis and the Y-axis of the camera body can be set accurately and correctly.

The angular velocity sensor 308 is connected to the connector 310 fixed on the substrate 309. The connector 310 is connected to the vibration reduction control device (not shown) within the camera body via the FPC (flexible printed circuit board) 311.

The vibration reduction unit housing 312 is mounted at the front region of the fixture barrel 301 and houses the vibration reduction mechanism 313 fixed on the interior thereof. The vibration reduction mechanism 313 travels the vibration reduction lens L3 substantially in the direction perpendicular to the optical axis, based on the control signal from the vibration reduction control device within the camera body. The cover 319 covers the outer region of the vibration reduction mechanism 313.

The vibration reduction unit housing 312, as shown in FIG. 17A, is fixed with the fixture barrel 301 by screwing the adjustment screw 314 into the tapped hole of the fixture barrel 301 via the longitudinal opening 301a. The mutual angle between the vibration reduction unit housing 312 and the fixture barrel 301 can be adjusted with respect to the optical axis L by the length of the longitudinal opening 301a, by loosening the adjustment screw 314.

In the vibration reduction unit housing 312, as shown in FIGS. 17B and 17C, the eccentric pin 315 is rotatably squeezed toward the center of the axis 315a. The head 315b of the eccentric pin 315 is inserted into the groove 301b formed in the fixture barrel 301. The eccentric pin 315 is squeezed with a predetermined torque, not to be rotated carelessly.

Next, explanation will be made below as for the method of adjusting the drive direction (X-axis, Y-axis) of the vibration reduction mechanism 313 and the sensitivity directions of each of the angular velocity sensors 308x and 308y.

When the adjustment screw 314 is slightly loosened to rotate the eccentric pin 315, the fixture barrel 301 follows with respect to the center of the optical axis L (in the direction of the arrow R in FIG. 16). Hence, the adjustment screw 314 is squeezed at the position where the sensitivity direction of the angular velocity sensor 308x agrees that of the angular velocity sensor 308y.

Since the eccentric pin 315 is tightly inserted into the groove 301b in the fixture barrel 301, no readjustment is required. The reason is that unless the eccentric pin 315 is rotated intentionally, the reassembling can be completely performed by fitting the head 315b of the eccentric pin 315 in the groove 301b of the fixture barrel 301 even when the vibration reduction unit housing 312 and the fixture barrel 301 are disassembled for repair or adjustment.

Moreover, the fixture barrel 301 and the lens mount 302 integrally combined do not depend on the angle between the upper position of the camera and the angular velocity sensor 308.

The present invention should not be limited only to the embodiments described above, but various modifications and variations can be covered in the scope of the present invention. For example, in the above embodiments, the eccentric pin is arranged to the vibration reduction unit housing and the groove is formed in the fixture barrel. However, the groove may be formed in the vibration reduction unit housing and the eccentric pin may be arranged to the fixture barrel.

What is claimed is:

1. A vibration reduction apparatus for a photographing optical system having an optical axis, comprising:
   a vibration sensor including an x-direction vibration sensor having a sensing axis to detect vibration in an x-direction with respect to the optical axis, and a y-direction vibration sensor having a sensing axis to detect vibration in a y-direction with respect to the optical axis;
   a position adjusting means for adjusting a sensitivity direction of said vibration sensor with respect to the optical axis of the photographing optical system,
   the position adjusting means including an adjustment screw to adjust the positions of the x-direction vibration sensor and the y-direction vibration sensor,
   wherein the positions of the x-direction and y-direction vibration sensors are adjusted such that the sensor axes correspond to predetermined x and y directions set in a plane perpendicular to the optical axis.

2. A vibration reduction lens barrel comprising:
   a vibration sensor to detect vibration, the vibration sensor having a sensing axis:
   a lens mount to mount the lens barrel to a body:
   a fixture barrel integral with the lens mount;
   a substate mounted to said fixture barrel, with said vibration sensor being fixed to said substrate;
   a rotational center shaft rotatably supporting said substrate with respect to said fixture barrel;
   an adjusting groove formed on said substrate; and
   a position adjusting member rotatably mounted on said fixture barrel and having an eccentric cam engaging with said adjusting groove, wherein the position adjusting member adjusts the position of the vibration sensor such that the sensing axis aligns with a predetermined direction in a plane perpendicular to the optical axis.

3. The vibration reduction lens barrel according to claim 2, further comprising a fixing member to fix said substrate to said fixture barrel after an adjustment by said adjusting member.

4. A vibration reduction lens barrel comprising:
   two sensors to detect different directions of vibration;
   a lens mount to mount the barrel to a body;
   a fixture barrel integral with the lens mount;
   a substrate mounted on said fixture barrel, with said two sensors being fixed to the substrate; and
   two flat portions, formed on said fixture barrel, to fix said substrate, said two flat portions being perpendicular to each other,
   wherein said two sensors are disposed on said two flat portions so as to be close to each other by a predetermined amount.

5. A vibration reduction lens barrel comprising:
   a lens mount to mount the lens barrel to a body;
   a two vibration sensors to detect vibration in two different directions;
   a fixture barrel fixed to the lens mount;
   a vibration reduction optical system which is movable in a vertical direction to the optical axis to correct vibration; and
   a vibration reduction mechanism to drive said vibration reduction optical system in response to a control signal based on the output from said vibration sensor,
   said two vibration sensors being fixed to said fixture barrel.

6. The vibration reduction lens barrel according to claim 5, further comprising a vibration reduction unit housing,
- wherein said vibration reduction mechanism is fixed to said vibration reduction unit housing which is coupled with said fixture barrel; and
- the vibration reduction lens barrel further comprising an angle setting means for setting relative rotational angular positions of said fixture barrel and said vibration reduction unit housing around the optical axis.

7. The vibration reduction lens barrel according to claim 5, further comprising a vibration reduction unit housing,
- wherein said vibration reduction mechanism is fixed to said vibration reduction unit housing which is coupled with said fixture barrel; and
- the vibration reduction lens barrel further comprising an angle adjusting means for adjusting relative rotational angular position of said fixture barrel and said vibration reduction housing around the optical axis.

8. The vibration reduction lens barrel according to claim 7, wherein said angle adjusting means includes an eccentric pin arranged in one of said fixture barrel and said vibration reduction unit housing and a groove formed in one of said vibration reduction unit housing and said fixture barrel to engage with said eccentric pin, whereby the relative rotational angular position around the optical axis of said fixture barrel and said vibration reduction unit housing can be adjusted by rotating said eccentric pin.

9. The vibration reduction lens barrel according to claim 5, wherein said vibration reduction mechanism is fixed to said vibration reduction unit housing coupled with said fixture barrel; and
- wherein the vibration reduction lens barrel further comprises an angle fixing means for fixing the relative rotational angular position around the optical axis of said fixture barrel and said vibration reduction unit housing.

10. A vibration reduction apparatus for a photographing optical system having an optical axis, comprising:
- a vibration sensor including an x-direction sensor having a sensing axis to detect vibration in an x-direction with respect to the optical axis, and a y-direction sensor having a sensing axis to detect vibration in a y-direction with respect to the optical axis;
- a position adjusting means for adjusting a sensing direction of said vibration sensor with respect to the optical axis of the photographing optical system,
- the position adjusting means including an adjustment screw to adjust positions of the x-direction vibration sensor and the y-direction vibration sensor,
- wherein the positions of the x-direction and y-direction vibration sensors are adjusted in a plane perpendicular to the optical axis.

11. A vibration reduction apparatus for a photographing optical system having an optical axis, comprising:
- a vibration sensor including an x-direction sensor having a sensing axis to detect vibration in an x-direction with respect to the optical axis, and a y-direction sensor having a sensing axis to detect vibration in a y-direction with respect to the optical axis;
- a position adjusting device to adjust a sensing direction of said vibration sensor with respect to the optical axis of the photographing optical system,
- wherein the positions of the x-direction and y-direction vibration sensors are adjusted such that the sensor axes correspond to predetermined x and y directions set in a plane perpendicular to the optical axis.

\* \* \* \* \*

UNITED STATES PATENT AND TRADEMARK OFFICE
CERTIFICATE OF CORRECTION

PATENT NO. : 6,330,398 B1  
DATED : December 11, 2001  
INVENTOR(S) : Etsuo Tanaka et al.

Page 1 of 1

It is certified that error appears in the above-identified patent and that said Letters Patent is hereby corrected as shown below:

<u>Column 20,</u>  
Line 44, after "the" insert -- lens --.

Signed and Sealed this

Thirtieth Day of April, 2002

Attest:

Attesting Officer

JAMES E. ROGAN  
*Director of the United States Patent and Trademark Office*